(12) United States Patent
Bender et al.

(10) Patent No.: US 9,420,810 B2
(45) Date of Patent: Aug. 23, 2016

(54) SHAPED FOOD ARTICLE MANUFACTURING SYSTEMS AND METHODS

(75) Inventors: Timothy J. Bender, North East, PA (US); Michael K. Vickery, Jonesboro, AR (US); Michael D. Trowbridge, Batesville, AR (US); Jeffrey H. Martin, Louisville, KY (US); Woodrow R. Guinnip, Evening Shade, AR (US)

(73) Assignee: Shearer's Foods, LLC, Massillon, OH (US)

( * ) Notice: Subject to any disclaimer, the term of this patent is extended or adjusted under 35 U.S.C. 154(b) by 628 days.

(21) Appl. No.: 13/428,016

(22) Filed: Mar. 23, 2012

(65) Prior Publication Data

US 2013/0078345 A1    Mar. 28, 2013

Related U.S. Application Data

(60) Provisional application No. 61/467,574, filed on Mar. 25, 2011.

(51) Int. Cl.
| | |
|---|---|
| *A21D 6/00* | (2006.01) |
| *B65D 85/08* | (2006.01) |
| *A23L 1/00* | (2006.01) |
| *A23L 1/16* | (2006.01) |
| *A23L 1/164* | (2006.01) |
| *A23L 3/10* | (2006.01) |
| *A23G 3/02* | (2006.01) |
| *A23P 1/00* | (2006.01) |
| *A47J 37/12* | (2006.01) |
| *A21B 3/13* | (2006.01) |
| *A23G 1/10* | (2006.01) |
| *A21B 1/48* | (2006.01) |

(Continued)

(52) U.S. Cl.
CPC ............. *A23L 1/0073* (2013.01); *A21B 1/48* (2013.01); *A21B 3/132* (2013.01); *A21B 5/00* (2013.01); *A23G 1/10* (2013.01); *A47J 37/12* (2013.01); *A23G 1/125* (2013.01); *A23L 1/1645* (2013.01)

(58) Field of Classification Search
CPC  A23L 1/0073; A23L 1/1645; A21D 13/0025; A21D 13/0029; A23B 3/132; A21B 5/00; A21B 1/48; A47K 37/12; A23G 1/10; A23G 1/125
USPC ........................................................ 426/502
See application file for complete search history.

(56) References Cited

U.S. PATENT DOCUMENTS

| | | | |
|---|---|---|---|
| 3,106,280 A | | 10/1963 | Baker et al. |
| 3,576,647 A | * | 4/1971 | Liepa .......................... 426/439 |

(Continued)

OTHER PUBLICATIONS

Pflugfelder et al., "Fractionation and Composition of Commercial Corn Masa". Cereal Chemistry. 65(3) pp. 262-266 (1988).*

(Continued)

*Primary Examiner* — Erik Kashnikow
*Assistant Examiner* — Assaf Zilbering
(74) *Attorney, Agent, or Firm* — Benesch, Friedlander, Coplan & Aronoff LLP

(57) ABSTRACT

Systems and methods for manufacturing edible food articles having three dimensional shapes from raw ingredients such as moist dough involve shaping preforms in an upside-down orientation over inverted cup-shaped molds. Shaping of the preforms is assisted by gravitational forces and directional forced airflow into relatively complicated three dimensional shapes with simplified equipment and manufacturing steps.

20 Claims, 25 Drawing Sheets

(51) Int. Cl.
  *A21B 5/00* (2006.01)
  *A23G 1/12* (2006.01)

(56) References Cited

U.S. PATENT DOCUMENTS

| | | | |
|---|---|---|---|
| 3,869,971 A * | 3/1975 | Driscoll | 99/353 |
| 3,949,660 A | 4/1976 | Kuhlman | |
| 3,963,402 A | 6/1976 | Berta | |
| 4,054,015 A | 10/1977 | Rowell | |
| 4,054,967 A | 10/1977 | Sandberg et al. | |
| 4,060,367 A | 11/1977 | Shatila et al. | |
| 4,076,476 A | 2/1978 | Ventura | |
| 4,371,327 A | 2/1983 | Fievez | |
| 4,873,099 A | 10/1989 | Ruiz | |
| D309,210 S | 7/1990 | Seyfert | |
| 4,975,039 A | 12/1990 | Dare et al. | |
| 5,298,273 A | 3/1994 | Ito | |
| 5,298,274 A | 3/1994 | Khalsa | |
| 5,399,367 A | 3/1995 | Mattson | |
| 5,400,698 A | 3/1995 | Savage | |
| 5,470,596 A | 11/1995 | Jones | |
| 5,580,583 A | 12/1996 | Caridis et al. | |
| 5,673,783 A | 10/1997 | Radant et al. | |
| 6,024,554 A | 2/2000 | Lawrence | |
| 6,403,135 B1 * | 6/2002 | Graham et al. | 426/389 |
| 6,530,771 B1 | 3/2003 | Clark | |
| 6,592,923 B2 * | 7/2003 | Chandler et al. | 426/512 |
| 6,638,553 B2 | 10/2003 | Bell et al. | |
| 2003/0066436 A1 * | 4/2003 | Bell et al. | 99/485 |
| 2006/0027941 A1 * | 2/2006 | Woerdeman | B29C 43/003 264/129 |
| 2011/0016718 A1 | 1/2011 | Herrera | |

OTHER PUBLICATIONS

"Homemade Taco Tortilla Bowls". Available online at www.melskitchencafe.com on Apr. 5, 2010.*

* cited by examiner

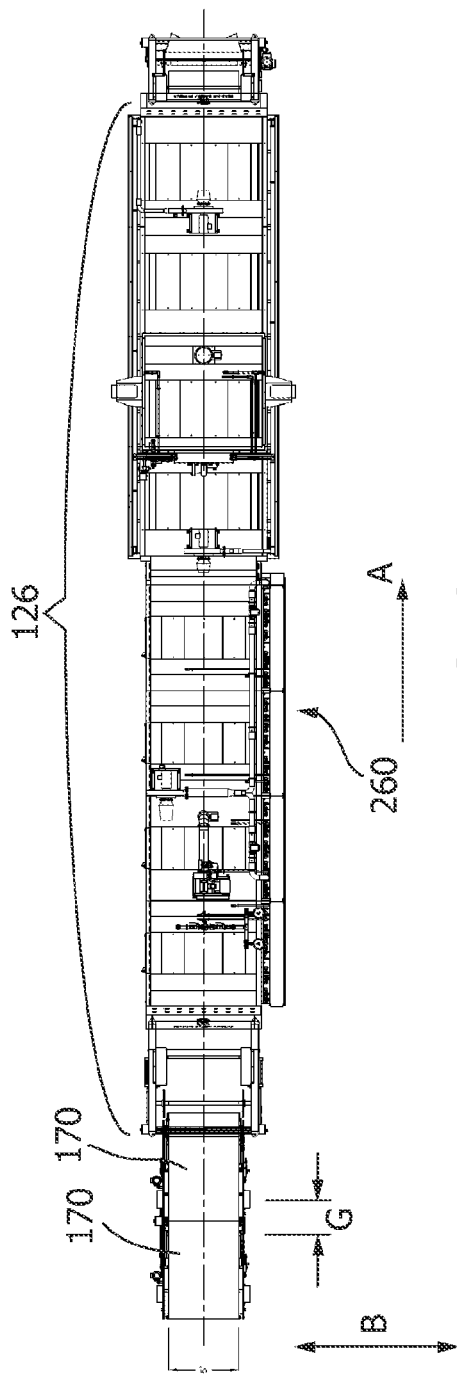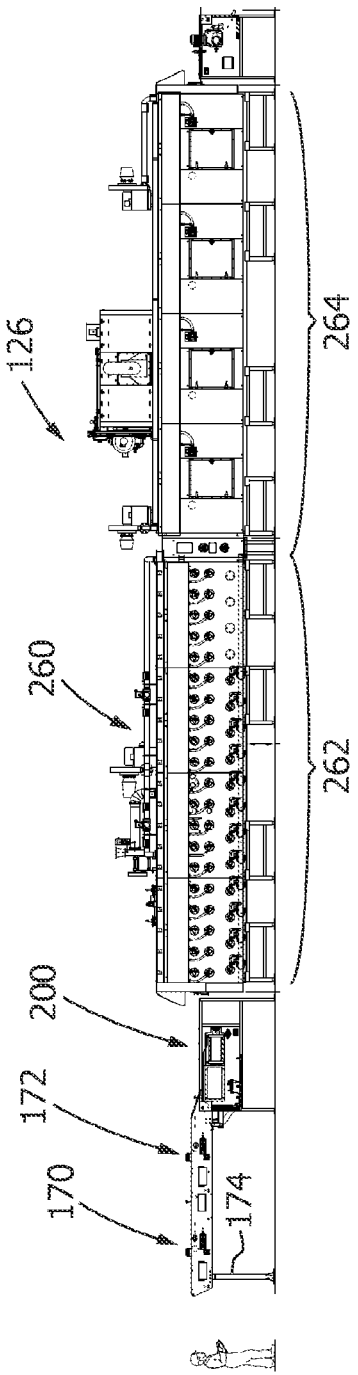
FIG. 8
FIG. 9

SHAPED FOOD ARTICLE MANUFACTURING SYSTEMS AND METHODS

CROSS REFERENCE TO RELATED APPLICATIONS

This application claims the benefit of U.S. Provisional Application Ser. No. 61/467,574 filed Mar. 25, 2011, the complete disclosure of which is hereby incorporated by reference in its entirety.

BACKGROUND OF THE INVENTION

The field of the invention relates generally to edible food manufacturing systems and methods, and more specifically to systems and methods for shaping edible food articles such as snack chips from batch ingredient materials otherwise lacking a defined shape for the desired product.

Edible food articles can be provided in rather complex shapes nowadays. One notable example of such shaped food articles is tortilla snack chips. Among other shapes, bowl or cup-shaped snack chips can be provided that are especially suited for consumption with various types of dips, cheeses, meat and other complementary food items and condiments enhancing the flavor of the chips. Such bowl-shaped chips conveniently allow the consumer to fill the shaped chip with as much flavoring dip or other edible product as desired, and subsequently transfer the filled chip to a consumer's mouth for consumption with minimal spillage and mess. Compared to more conventional and generally flat-shaped snack chips, such bowl-shaped snack chips are preferred by many consumers.

Reliably shaping food articles such as snack chips while lowering costs presents a number of manufacturing challenges, and improvements are desired.

BRIEF DESCRIPTION OF THE INVENTION

Exemplary systems and methods for manufacturing edible, shaped food articles are described including air and gravity assisted molding processes allowing thin, flat, round and moist dough pieces to be formed and shaped over molds into a relatively complex, three dimensional cup-shaped food product. The systems and methods may be implemented in a lower cost and more reliable manner than known systems and methods for providing snack chips, for example.

More specifically, in exemplary embodiments of systems and methods for producing edible food articles such as shaped snack chips, a batch of moist and unshaped masa dough made up of ground cooked corn is mixed and provided as an initial batch ingredient in, for example, a large, flat sheet having about a ¾ inch thickness. The cooked corn masa dough, in a moist and flat or unshaped form, is input to sheeter equipment where it is squeezed and cut into discrete circular pieces of generally flat dough, sometimes referred to as chip preforms, at a sheeting stage of manufacture. The chip preforms are output onto a sheeter belt in a side-by-side arrangement in a plurality of rows extending in a direction laterally across the sheeter belt (i.e., rows extending in line with the path of movement of the sheeter belt). The sheeter includes a cutter roller having an optimized cutting pattern to cut adjacent rows of preforms that are substantially identical to one another. Further, the preforms are deposited on the sheeter belt with a consistent centerline-to-centerline spacing in each row, and the centerlines of the preforms in adjacent rows are aligned with one another in a direction parallel to the path of movement of the belt. A high density arrangement of preforms is therefore provided on the sheeter belt in which substantially the entire length and width of the sheeter belt is occupied by the rows of preforms.

The sheeted chip preforms, while still in a moist and generally pliable state, may be transferred from the sheeting stage, via one or more transfer conveyor belts, to a forming stage where the chip preforms are draped over a top surface of inverted or upside-down ribbed molds, also carried on a conveyor belt, sometimes referred to herein as a forming belt. Synchronized feeding of the sheeted, moist dough preforms from the sheeter belt to the forming stage at the proper position may be provided in a relatively simple manner using a series of transfer belts operating at different speeds.

In one exemplary embodiment, a first transfer belt is operated at a first speed that is higher than a speed of the sheeter belt, and the second transfer belt is operable at a second speed that is higher than the first speed of the first belt. The forming belt that carries the ribbed molds through the forming stage is operable at a third speed, which in an exemplary embodiment is higher than the second speed. By strategically coordinating the first, second and third speeds, the preforms can be delivered to the molds so that the centerlines of the preforms and the molds coincide where they meet, and the centerline spacing between adjacent rows of preforms also coincides with the spacing between the molds on the forming belt. Alternatively, the second transfer belt may operate at substantially the same speed. The forming belt may likewise be operated at substantially the same speed as the last transfer belt feeding preforms to the forming belt for smooth transition of the preforms on the ribbed molds. Numerous variations are possible.

The different speeds of the transfer belts increase the centerline spacing between the adjacent rows of preforms output by the sheeter, without altering the spacing of the preforms in each row, so the preforms reach the forming belt in a position synchronized with the position of the molds to ensure that the moist dough preforms are deposited in a substantially centered position on the molds in the forming stage. The speeds of the sheeter belt, the first transfer belt, the second transfer belt, and the forming belt can be independently set or may be controlled in a cascading manner according to predefined ratios of the forming belt speed. The second transfer belt also delivers the preforms at an angle relative to the path of movement of the molds on the forming belt. In one example, the second transfer belt is inclined at about a 20° angle relative to the forming belt to further assist the placement of the preforms on the molds.

The transfer belts may further be adjustable in position relative to the forming belt from side-to-side to counteract any tendency of the belts to "walk" or move in a direction perpendicular to the path of travel of the preforms as the transfer belts are used. Sensors and the like, including but not limited to machine vision systems, may be used to detect alignment of the chip preforms with the mold racks in real time, and the relative position of the entire transfer belt assembly vis-à-vis the forming station may be readjusted in response to feedback from the sensors. Alignment of the preforms with the forming stage may accordingly be maintained for longer periods of time without having to shut the system down for readjustment.

At least one of the transfer belts may also be movable in relation to the forming belt to form a gap therebetween to prevent transfer of preforms to the forming stage. The movable transfer belt may likewise be automatically operated to form the gap and prevent transfer of the preforms to the forming stage, based on feedback from sensors including a machine vision system. When the gap is opened, the sheeted preforms fall into the gap rather than proceeding to the forming stage, and when the gap is closed, the sheeted transforms are delivered to the forming stage. As such, by opening the gap, an automated interrupt of the perform transfer to the forming stage may be accomplished when certain conditions are detected.

For example, misformed preforms from the sheeting stage and preforms that are out of alignment with the mold assemblies can result in belt contamination issues in the forming stage. That is, instead of the preforms falling on the molds as described below for processing, they can instead fall into interior portions of the belt. Aside from making a mess, this can raise reliability issues of the forming belt in use. Further, safety issues can even arise when a contaminated belt is extended through a very hot oven because the pieces of dough on the interior portions of the belt may ignite and catch fire. Aside from contamination issues, however, manual opening and closing of the gap may also facilitate setup and troubleshooting of the system.

With assistance of gravity and directional forced airflow, the moist dough preforms may be draped, pressed and directed over the exterior top and outer sides of the inverted ribbed molds to impart a desired three-dimensional cup-shape to the preforms. The forming belt, which is also extended through an oven in the forming stage, allows for advantageous pre-heating of the molds prior to delivery of the preforms transferred to them. Pre-heating of the molds reduces, if not eliminates, a tendency of the preforms to stick to the molds as they are formed and baked on the forming belt.

At least one blower may be used with at least one directional control orifice plate or manifold to simultaneously generate a desired airflow at predetermined pressures and orientation over and around multiple molds in the forming stage. Uniform shaping of the moist dough preforms, when placed on the molds, can accordingly be ensured prior to baking using a relatively simple and low cost arrangement that does not require physical, mechanical contact with the chip preforms to press them into shape. Also, while using a relatively simple mold design, relatively complex shapes of the chip preforms are possible. Multiple geometric configurations of the directional airflow, and considerable variation in airflow provided are possible to provide different geometrical shapes and features to the chip preforms using the same or different mold designs.

The molds may be formed and fabricated from wire members assembled to mold racks, sometimes referred to as mold channels, for shaping of the chips in a batch process. Each mold provides a relatively small surface area for contact with the respective chip preforms at the forming stage, but the molds still provide the necessary support to the preforms so that they can be shaped in a non-rigid moisturized state without undesirable tearing. In one example, the wire members used to form the molds may be arranged in a star-shaped, spoke-like pattern defined by five wire members forming a basket-like or cup-shaped outer profile and a pentagonal support member, also fabricated from a wire member, may be attached to a periphery of the five wire members forming the cup shaped-outer profile. The outer profile of the molds produces shaped preforms having an outwardly flared or tapered side wall including a wavy side surface profile with both convex and concave surfaces. Wire mesh materials and the like may optionally be provided on the mold to increase surface contact with the moist chip preforms as they are shaped. A variety of sizes and shapes of the snack chips are of course possible.

Moreover, the molds are rather easily assembled and disassembled from the mold racks such that individual molds can be selectively removed and replaced as desired with a mold of the same or different shape. Maintenance issues can accordingly be simplified and, a desirable capability to simultaneously shape the moist chip preforms into different shapes is facilitated, depending on which types of molds are attached to any given mold rack.

Different shapes of wire molds can be used on the same mold rack by virtue of a universal mounting arrangement. Different mold racks can further be provided with different types of wire molds, leading to considerable flexibility and adaptation of forming various shapes. This can occur without significant alternation of the manufacturing line or system. The molds can be attached to the mold racks with a single fastener such as a rivet, and the molds may be designed to separate or fall from the mold rack if the fastener fails and possible falls into the food product, thereby providing clear notice of a potential contamination of the food product being produced that may otherwise be very difficult to detect.

The formed or shaped preforms may be carried on the inverted cup-shaped molds and the mold channels, via the forming belt, directly to and through an oven to toast and bake the shaped preforms. In the oven, the shaped, moist preforms are dried as they are toasted and baked, and the moisture removal results in rigid, crisp, cup-shaped snack chips that retain the formed shape. The mold racks are fabricated with large open areas facilitating air flow through the racks and around the shaped preforms for efficient toasting and baking in the oven. The oven has multiple zones each providing different heat sources, and the forming belt makes a single pass through each of the oven zones while the preforms remain on the molds. After toasting and baking is complete, the rigidified chips may be removed from the inverted, cup-shaped molds with gravity assistance and directional forced airflow.

The rigidified chips having the cup-shape fall a short distance onto an oven discharge belt that includes an inclined section raising the rigidified chips to a fryer in the frying stage. The fryer includes a submerger belt and baffles carrying the chips through oil in the fryer for a designated amount of time. The chips are manipulated either through the use of staggered drops in the take-out belt of through the use of forced air as they exit the fryer in a manner to ensure that collected oil in the cup-shaped receptacles in the chips is removed. After the oil is removed and the chips are dry, the chips are sent to a seasoning stage, if applicable, and then to a final packaging stage.

Various adaptations and refinements of the systems and methods for shaping edible food articles are possible, and food articles other than snack chips may benefit from the inventive concepts disclosed.

BRIEF DESCRIPTION OF THE DRAWINGS

Non-limiting and non-exhaustive embodiments are described with reference to the following Figures, wherein like reference numerals refer to like parts throughout the various drawings unless otherwise specified.

FIG. 8 is an exemplary top view of a portion of a manufacturing line including the transfer belts shown in FIG. 7 in combination with the forming stage equipment.

FIG. 9 is a side elevational view of the portion of the manufacturing line shown in FIG. 8.

DETAILED DESCRIPTION OF THE INVENTION

Figure 1:
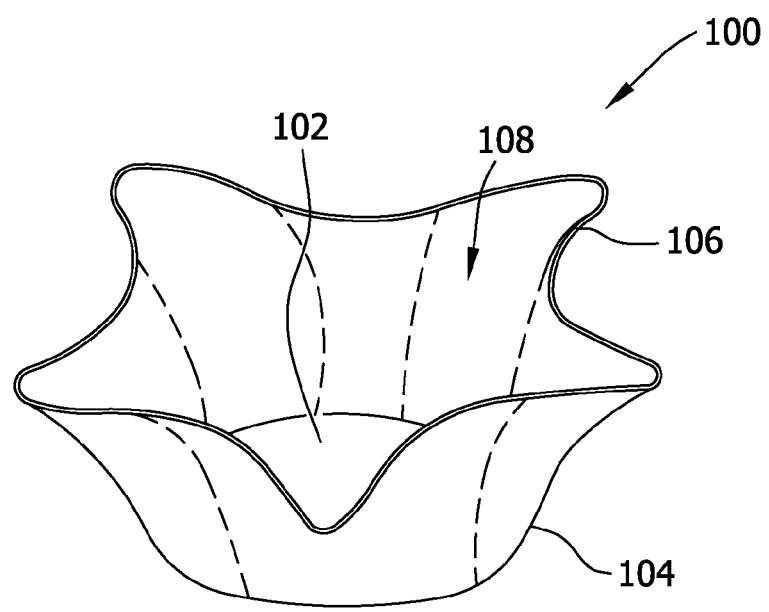
FIG. 1 is a perspective view of an exemplary edible shaped food article that may be formed with the exemplary systems and methods described.

Exemplary systems and method for producing shaped food articles such as snack chips are disclosed hereinbelow that overcome numerous difficulties and disadvantages in the art. In order to understand the invention to its fullest extent, some discussion of the state art and difficulties associated therewith is warranted. Accordingly, Part I below discusses the state of the art and associated problems and disadvantages, while Part II below describes exemplary embodiments of the invention and related methods that overcome difficulties and drawbacks of the state of the art. Method aspects will be in part apparent and in part specifically discussed in the description below.

Part I: Introduction to the Invention

Manufacturing and processing of edible food items into three dimensional shapes, including but not necessarily limited to snack chips, from initial ingredients otherwise lacking shape presents a number of challenges to those in the industry.

U.S. Pat. No. 6,129,939 describes systems and methods for producing shaped snack chips utilizing relatively customized fryers adapted for frying dough in bowl-shaped molds to form snack chips. Practically speaking, specialized oils are needed for such fryers, and the complexity of the frying tends to impose practical limitations on manufacturing capacity. Customized fryers and special oils are also relatively expensive, and lower cost options have been pursued.

U.S. Pat. Nos. 6,592,923 and 6,610,344 describe methods and systems for making shaped snack chips that involve toasting of the dough after sheeting it into generally flat and moist preforms, but prior to shaping the preforms with the bowl-shape molds. Such toasting removes moisture from the sheeted dough preforms and provides a degree of rigidity and other desirable properties to the preforms for subsequent shaping and processing. While such toasting can facilitate the shaping of the preforms, the toasting introduces other problems in the manufacture of snack chips that must be addressed. Specifically, as described in U.S. Pat. No. 6,592,923 the toasting of the preforms tends to cause them to become scattered and misaligned on a toasting belt. Relatively complex alignment features are accordingly described in U.S. Pat. No. 6,592,923 to realign the toasted preforms prior to their transfer to the shaping molds. While the toasted chips can be successfully realigned for efficient shaping in the molds, the cost and complexity of doing so are preferably avoided.

Still further, as described in U.S. Pat. No. 6,610,344 relatively complex mechanical systems are utilized to positively shape the chips in molds. Specifically, U.S. Pat. No. 6,610, 344 describes an array of mechanical plungers that are mechanically integrated and synchronized with a mold belt that carries the shaping molds. The array of plungers are selectively extended downwardly into the bowl-shaped molds and then refracted upwardly from the bowl-shaped forms as the molds are moved along the belt. The plungers are ascended and descended relative to the moving mold racks to mechanically contact the preforms and press the toasted dough preforms into the bowl-shaped forms of the mold racks. The formed chips are then removed from the mold racks and fried. While such mechanical plunger systems can be effective to shape the chips, they are relatively complex and subject to numerous maintenance and reliability issues that, over time, can materially affect manufacturing efficiency and cost.

Finally, U.S. Pat. Nos. 6,592,923 and 6,610,344 involve relatively complicated, single piece molds that are further illustrated in U.S. Pat. No. D459,853. Specifically, the mold racks are provided so that each mold rack defines a number of half-molds on opposing lateral sides of the racks. When such mold racks are aligned side-by-side, the half-molds align with one another along the facing lateral side edges of the racks, and adjacent mold racks therefore in combination define whole or complete bowl-shaped forms so that the toasted dough preforms can be shaped with the plungers using parts of each mold rack. After shaping, the formed or shaped preforms can be removed from the molds by separating the adjacent mold racks to release the shaped chips from the molds. Such design of the molds, however, results in a rather intricate, complex shape of the mold racks that increases the costs of obtaining the molds, as well as a severely limited ability to vary the shape of the chips produced. It would be desirable to reduce the number of mold racks needed to manufacture the shaped snack chips, simplify the mold design, and provide an increased ability to vary the shape of the chips produced.

Simplified systems and methods for manufacturing edible shaped food articles are desired. Any reduction in the complexity of the equipment utilized, the complexity of process steps performed, or in the number of steps required to produce food articles such as snack chips is, of course, significant to the high volume snack food industry. Also, any improved reliability of forming the shaped food articles would reduce scrap and increase overall manufacturing efficiency.

Part II: Inventive Systems and Methods for Producing Shaped Edible Food Articles Exemplary systems and methods for shaping edible food articles such as snack chips from raw ingredient materials otherwise lacking a defined shape are described below that overcome numerous problems in the art such as those discussed above, or alternatively provide numerous benefits that have been heretofore difficult, if not impossible, to provide in a reliable cost effective manner. The exemplary systems and methods capably satisfy longstanding but unfulfilled needs in the marketplace as will be explained in some detail below. Method aspects will in part be apparent and in part specifically discussed in the description below.

FIG. 1 is a perspective view of a shaped edible food article 100 that may be formed with the exemplary systems and methods described. In the example shown, the article 100 is a snack chip having a generally cup-like shape including a base 102 and a continuously extending but curvilinear side wall 104 extending upwardly from the base 102. The side wall 104 has an upper edge 106 that is star-shaped, and the side wall 104 in the example shown has five outwardly flared or tapered side surfaces extending from the base 102 to the upper edge 106. The side wall 104 culminating in the upper edge 106 has a wavy side surface profile with both convex and concave surfaces. Thus, in the illustrated example, an edible food article having a rather complex outer shape and profile is shown that is difficult, if not impossible, to produce in a cost effective manner using known manufacturing systems and methods.

The chip base 102 and side wall 104 collectively define an interior cavity or receptacle 108 that a consumer may conveniently utilize with a desired type of dip, cheese, meat and/or other complementary foods and condiments to enhance the flavor of the chip. The receptacle 108, like some known chips, conveniently allows the consumer to fill the receptacle 108 with as much flavoring dip or other edible product as desired, and to subsequently transfer the filled chip to his or her mouth for consumption with minimal spillage and mess.

The chip 100 may be formed from a raw dough material, and more specifically a cooked corn masa dough, and subsequently shaped into the illustrated, three dimensional shape of FIG. 1. It should be understood, however, that the systems and methods described below, as well as the exemplary shape of the food article 100 are exemplary only. Other types of dough and other raw materials may be used to manufacture edible food articles besides snack chips. Other edible shaped food articles may benefit from the systems and methods described below to shape food articles into the same or different shapes than that illustrated in FIG. 1. As such, the exemplary food article 100 and the systems and methods for producing it as described below are provided for the sake of illustration rather than limitation.

Figure 12:
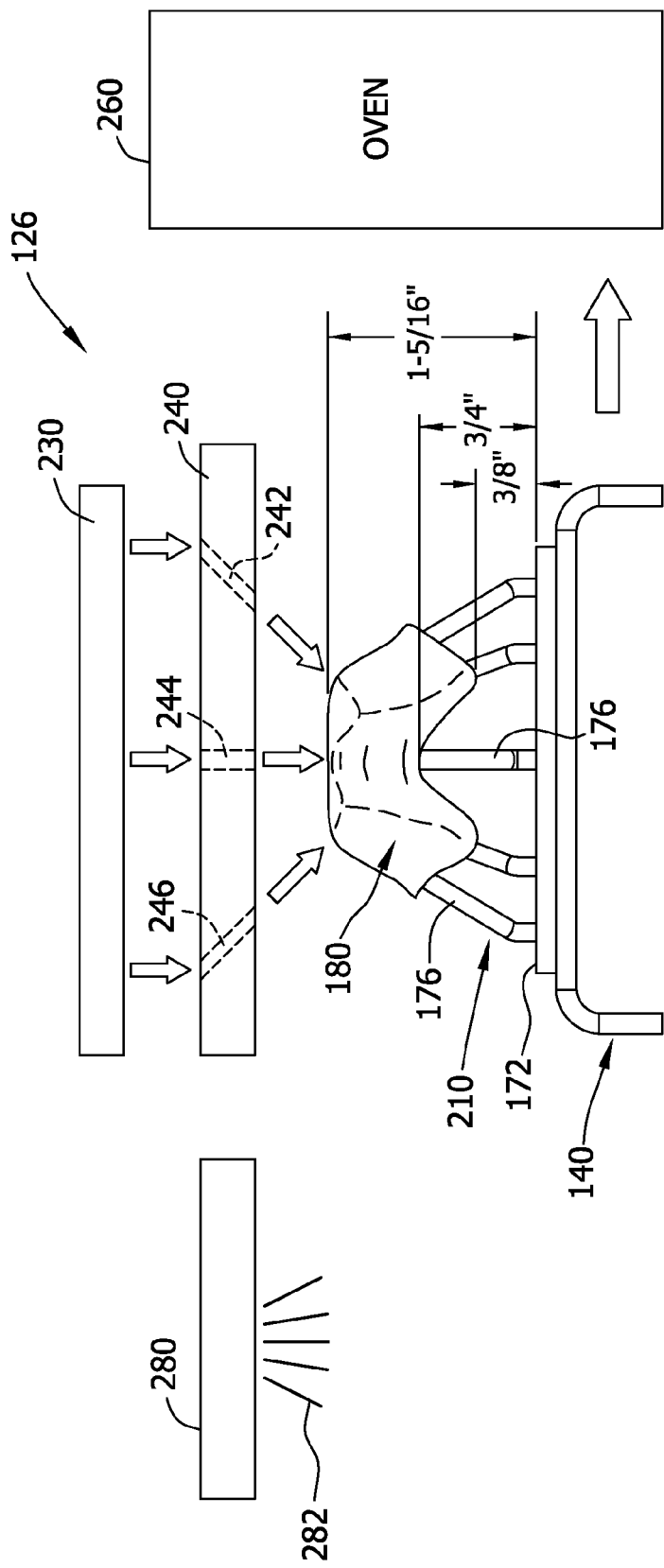
FIG. 12 illustrates a shaping process of a piece of dough on a mold assembly.

As will become evident below, the inventors have discovered that one of the keys to forming a shaped food article 100, such as the snack chip shown in FIG. 1, is to shape it in an upside-down orientation while the article is in a non-rigid state. That is, in FIG. 1, the chip 100 is shown right-side-up in the orientation that a consumer would enjoy it (i.e., with the receptacle 108 facing upward as shown). By shaping it in an upside-down orientation as best seen in FIG. 12 described below, a number of benefits ensue, including but not limited to a simpler formation process having a reduced number of manufacturing steps, the use of simpler mold racks, and the avoidance of complex mechanical assemblies and control features common to known systems and methods for producing similar food articles. The upside-down formation of the article while in a non-rigid state advantageously utilizes gravitational forces to partially form the non-rigid food article into a desired shape. Final shaping of the article while in a non-rigid state may be accomplished utilizing non-contact methods. Compared to more conventional right-side up formation techniques on food articles that are at least partly rigidified, physical mechanical contact force and manipulation of the rigidified food article, and associated difficulties and problems, are effectively avoided as further described below in favor of simpler, yet highly effective manufacturing processes.

Figure 2:
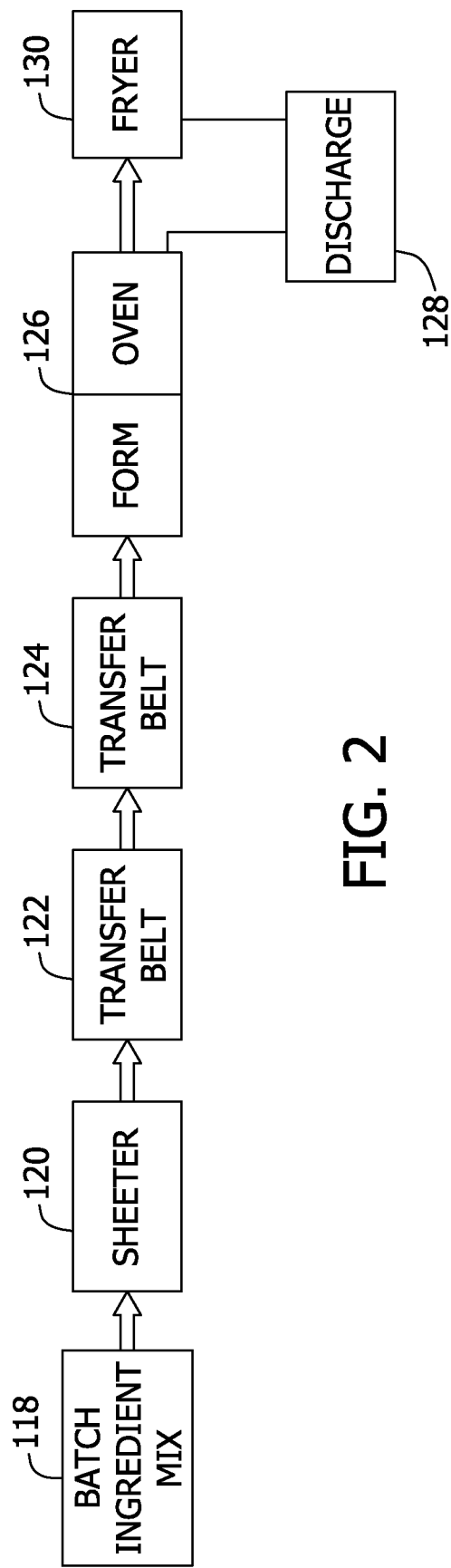
FIG. 2 is a first block diagram of exemplary equipment and processes utilized in the proposed systems and methods for manufacturing the food article shown in FIG. 1.
Figure 3:
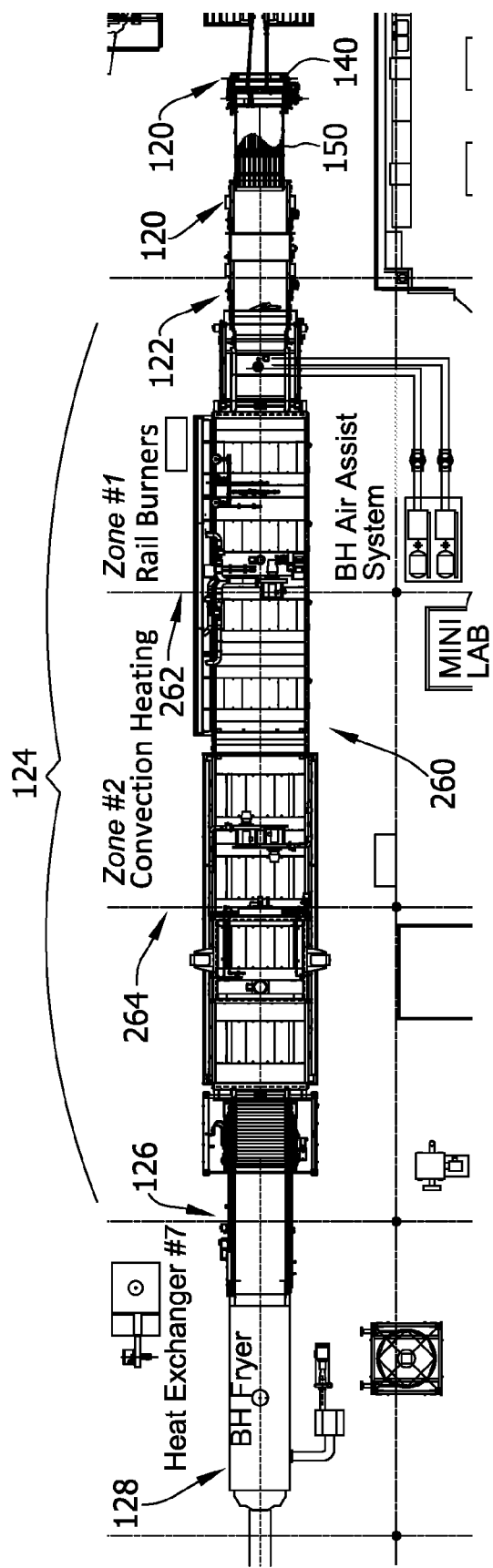
FIG. 3 is a top view of an exemplary equipment line implementing the manufacturing stages shown in FIG. 2.

FIG. 2 is a first block diagram of exemplary equipment and processes utilized in the proposed systems and methods to provide shaped food articles such as the snack chip 100. FIG. 3 shows an exemplary equipment line implementing the stages shown in FIG. 2.

As shown in FIGS. 2 and 3, the equipment and processes utilized generally includes a batch ingredient mixture step and equipment (hereinafter a mixing stage 118), a sheeter step and equipment (hereinafter the sheeting stage 120), transfer belt steps and equipment (hereinafter the transfer stages 122 and 124), combined forming and backing equipment steps and equipment (hereinafter the forming stage 126), oven discharge steps and equipment (hereinafter the discharge stage 128), and a fryer step and equipment (hereinafter the frying stage 130).

In contemplated embodiments, in the mixture stage 118 the masa dough is made from finely ground cooked corn using, in one example, the following techniques. Water is fed to a steam jacketed kettle, and corn is fed to the kettle in about an equal amount to the water as steam is applied to the jacket. Lime is also added to the water as the corn is being fed under agitation to a corn-lime slurry. Over a rise time of approximately 25 minutes, the steam raises the temperature of the slurry to a target cook temperature of about 195° F., and the slurry is cooked at the target cook temperature for about three minutes. After three minutes of cooking, the slurry is quenched with water to reduce the temperature to about 150° F. The quenches slurry is thereafter soaked in the mixture for a period of time to allow water absorption, such as overnight. It is understood that the cooking temperature, cooking time, soaking time, etc. may vary considerably depending on crop specifics for the corn utilized and regional variations.

The soaked, cooked corn is then drained, washed and surface water is removed in a washing drum. In one example, the soaked, cooked corn is processed in a washing drum at a drum speed of about 42 rpm, with a drum inclination of about 5° to about 15° from horizontal, a spray bar feed of about 80 psig and a drain belt resistance time of about four minutes. Mechanical abrasion in the washing drum aids in removing the corn pericarp.

The washed corn is then ground into masa having a fine particle size of about 0.030 inches using grinding stones or other suitable techniques. In one example, the washed and drained corn is milled with an average mill gap of about 40 mils. Water is added in the mill to and the milled corn is mixed to produce an even consistency of masa dough having a moisture of about 46% and a temperature of about 100° F. At this point, other optional ingredients familiar to those in the art may also be mixed into the dough. Ultimately a semi-soft masa dough is provided as an initial input to the sheeter stage 120. While 0.030 inch cooked corn particles in the masa dough mix is believed to be advantageous, corn particles ranging in size from about 0.029 inches to about 0.033 inches may alternatively be used.

While such finely ground cooked corn masa dough is believed to impart desirable properties that facilitates the manufacturing processes and methods in the following stages explained below, it is possible that other types of dough may be used as an initial raw ingredient input to the systems and methods described.

The masa dough is provided as an initial batch ingredient for input to the sheeter stage 122. In one exemplary embodiment, the masa dough is provided in, for example, a large, flat sheet having about a ¾ inch thickness. Other forms of the batch ingredient are possible, however, in other embodiments.

Figure 4:
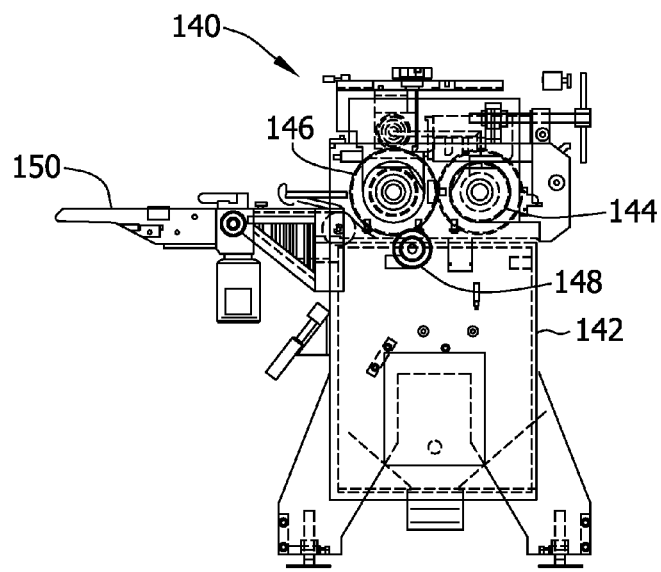
FIG. 4 is a side elevational schematic view of an exemplary sheeter for the sheeting stage shown in FIG. 2.

FIG. 4 illustrates sheeter equipment 140, referred to hereinafter as a sheeter, that may be utilized in the sheeting stage 120 (FIG. 1). The sheeter includes a base 142, counter-rotating compression rollers 144 and 146, a cutter roller 148, and a sheeter belt 150.

The cooked corn masa dough from the mixing stage 118 (FIG. 1) is provided as an input to the counter-rotating rollers 144, 146 where it is squeezed and flattened therebetween. The compression rollers 144, 146 are run at different speeds, with the back roller 146 running faster than the front roller 144. As it is compressed, the dough is stripped from the roller 144 while adhering to the roller 146. Both rollers 144, 146 are true right cylinders having a constant radius along the axial length of the rollers, and are sometimes referred to as "flat" rollers. The use of flat rollers contrasts conventional rollers utilized in sheeting equipment wherein each of the rollers has a varying radius along their axial length, and thus include a convex or concave curvature along the axial length of the rollers. The use of true right cylinders simplifies the sheeter construction and also facilitates alignment of the sheeted dough pieces as described further below.

Figure 5:
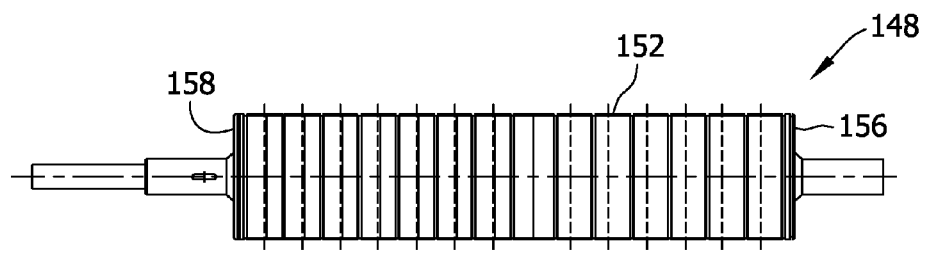
FIG. 5 is a front elevational view of an exemplary cutter roller for the sheeter shown in FIG. 4.
Figure 6:
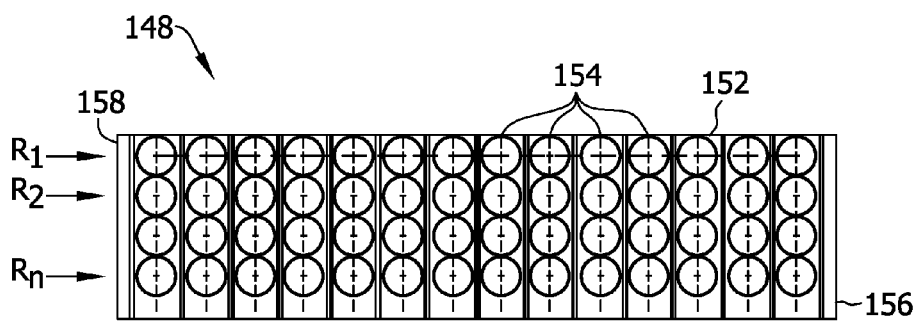
FIG. 6 illustrates a cutting pattern for the cutter roller shown in FIGS. 4 and 5.

The cutting roller 148 contacts the outer surface of the compression roller 146 and cuts the dough into a desired pattern. The cutting roller 148 is shown in FIG. 5 and the cutting pattern is shown in FIG. 6. The cutting roller 148 is configured to cut the dough into discrete circular pieces of generally flat dough, sometimes referred to as chip preforms, that are output to the sheeter belt 150.

Turning now to FIGS. 5 and 6, the cutting roller 148 is provided with a pattern 152 defining an array of circular cutting templates 154 extending substantially entirely between the opposing ends 156, 158 of the cutting roller surface upon which the pattern 152 is created. The circular templates 154 each produce a discrete, circular preform piece of dough. After the dough is compressed by the rollers 144, 146 to a desired thickness, the roller cutter 148 imprints the pattern shown in FIG. 5, including the circular templates 154 onto the dough adhered to the roller 146. The patterned dough is stripped from the roller 146, via a wire, and the circular preforms are deposited onto the sheeter belt 150 for processing as described further below. Scraps of dough that remain adhered to the roller 146 may be recycled back into the dough that is input between the compression rollers 144, 146.

As shown in FIGS. 5 and 6, the templates 154 producing the preforms are circular in shape and are in aligned rows $R_1$, $R_2$ through $R_n$, where n is an integer determined in part by the circumference of the roller cutter 148 and in part by the diameter of the templates 154. In an exemplary embodiment, the diameter of the templates 154 is about 3 inches, although greater or lesser diameters may be utilized as desired.

Figure 7:
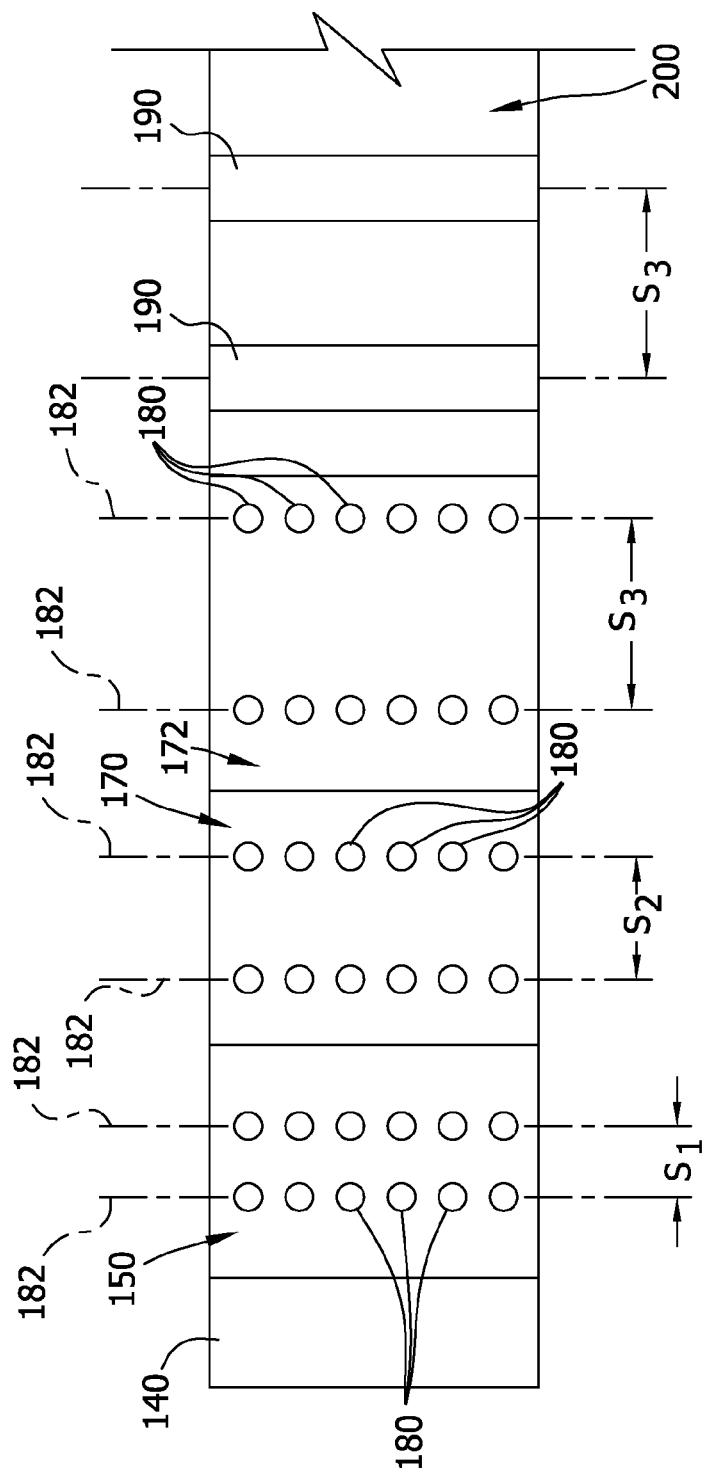
FIG. 7 is a top view of a portion of the equipment shown in FIG. 2 illustrating the transfer of moist dough pieces from the sheeting stage to the forming stage.

Each row $R_1$, $R_2$ through $R_n$ in the example pattern shown includes 14 templates 154 apiece arranged horizontally in FIG. 6 or generally perpendicular to the ends 156, 158 of the cutting surface 152. When deposited on the sheeter belt 150, the rows extend laterally across the width of the sheeter belt 150 as shown in FIG. 7. Adjacent templates 154 in the pattern further define columns extending vertically in FIG. 6 or generally parallel to the ends 154, 156 of the cutting surface 152. The templates 154 in the columns and rows define a uniform array of wherein each column and row is identical to adjacent columns and rows in the pattern 152.

Further, adjacent templates 154 in the pattern are arranged with a consistent lateral centerline-to-centerline spacing in the horizontal direction of FIG. 6, and also are arranged in a consistent longitudinal centerline-to-centerline spacing in the vertical direction of FIG. 6. The centerline spacing shown is constant in the vertical and horizontal direction, and there is little separation between the adjacent templates 154 in the vertical and horizontal directions corresponding to the rows and columns in the pattern 152. As discussed below, the lateral centerline-to-centerline spacing in the horizontal direction of the preforms produced is selected to correspond with lateral centerline-to-centerline spacing of the molds utilized in the forming stage 126 (FIG. 1) and accordingly does not change once deposited on the sheeter belt.

The templates 154 in the pattern therefore produce corresponding chip preforms that are deposited on the sheeter belt 150 in a side-by-side arrangement in a plurality of rows extending in a direction laterally across the sheeter belt with adjacent rows of preforms being substantially identical to one another, and with little separation between the adjacent preforms.

The cutting roller 148 produces a full array of templates 154 with complete rows and columns. By virtue of the cutter roller 148, a high density arrangement of preforms is therefore provided on the sheeter belt 150 that facilitates increased production of preforms in less time and at a reduced cost.

In an exemplary embodiment, the sheeter 140 produces discrete preforms having a weight of about 55 grams apiece, and the preforms are about 3 inches round. This is advantageous for the processing steps described below, but it is understood that other sizes and weights of preforms could alternatively be used to produce different sizes and shapes of food product.

While an exemplary sheeter 140 has been described, a variety of alternative sheeters are known and available from various sources, any of which may alternatively be used. For the reasons discussed above, however, conventional sheeters would likely not be as efficient as the sheeter 40 from a manufacturing perspective.

FIGS. 7-11 illustrate exemplary equipment utilized in the transfer stages 122, 124 shown in FIG. 1. As seen in FIGS. 7-11, a series of transfer belts 170 and 172 is provided between the sheeter equipment 140 (FIG. 4) in the sheeting stage 120 and the forming stage 126. The transfer belts 170, 172 facilitate synchronized feeding of the sheeted, moist dough preforms to the mold racks described below in the forming stage 122 at the proper position. Synchronized transfer of the preforms is accomplished in a relatively simple manner using a combination of the sheeter belt 150 and the transfer belts 170, 172 operating at different speeds.

As illustrated in FIG. 7 in top view with exaggeration for the present discussion, in an exemplary embodiment the first transfer belt 170 is operated at a first speed that is higher than a speed of the sheeter belt 150. That is, for the purposes of discussion, the preforms 180 as deposited by the sheeter 140 are aligned such that the centerlines of the preforms 180 are aligned in a lateral direction. The lateral centerline alignment of the preform rows are indicated by the elements 182 in FIG. 7.

The sheeter 140, by virtue of the cutter roller pattern discussed above, deposits the rows of preforms 180 at a generally constant centerline-to-centerline spacing $S_1$ between adjacent rows 182a, 182b of preforms 180 on the sheeter belt 150. In an exemplary embodiment the centerline-to-centerline spacing $S_1$ is relatively small and the edge-to-edge spacing of adjacent preforms 180 in adjacent rows may be as small as about 0.125 inches to about 0.25 inches. The actual speed of the sheeter belt 150 may vary depending on the sheeter actually used, and if the centerline-to-centerline spacing $S_1$ of the adjacent preform rows 182a, 182b is different from a centerline-to-centerline spacing of mold racks 190 on a forming belt 200 in the forming stage 126 (FIG. 1), the transfer belts 170 and 172 may adjust and account for any differences in the centerline-to-centerline spacings so that the rows of preforms 180 may nonetheless be deposited in a generally centered position on the mold racks 190 so that they can be properly shaped as described below. In one example, the conveyor belt speed is about 80 fpm.

At the end of the sheeter belt 150, the aligned rows of preforms 182a, 182b are transferred to the first transfer belt 170. As described above, the first transfer belt 170 is operated at a different and higher speed in the illustrated example than the sheeter belt 150 such that the spacing between the adjacent preform rows deposited on the transfer belt 170, as indicated by elements 182c and 182d is increased to a centerline-to-centerline spacing value $S_2$ that is larger than the centerline-to-centerline spacing $S_1$ on the sheeter belt 150. In one contemplated embodiment, the speed of the first transfer belt 170 may be about 85 fpm. At the end of the first transfer belt 170, the aligned rows of preforms 182c, 182d are transferred to the second transfer belt 172.

The second transfer belt 172 is operated at a second speed that is different from, and in the illustrated example, higher than, the speed of the first transfer belt 170. Because of the different belt speeds, the spacing between the adjacent preform rows deposited on the second transfer belt 172, as indicated by elements 182e and 182f is increased to a centerline-to-centerline spacing value $S_3$ that is larger than the centerline-to-centerline spacing $S_2$ on the first transfer belt 170. In one contemplated embodiment, the speed of the second transfer belt may be about 93 fpm.

At the end of the second transfer belt 172, the aligned rows of preforms 182c, 182d are deposited onto the forming belt 200, which carries the mold racks at a centerline-to-centerline distance that is about equal to the spacing $S_3$ produced on the second transfer belt 172. The mold belt 200, in turn, may travel closer to the speed as the second transfer belt 172. In exemplary embodiments, $S_3$ may be approximately four inches, and the forming belt speed may be about 100 fpm.

With strategic selection of the transfer belt speeds the required centerline-to-centerline spacing of the preform rows may be adjusted to ensure that the preforms 180 are transferred to the forming stage 126 at the proper speed and the preforms 180 may be placed in a centered position on the mold assemblies (described below) carried on the mold racks 190.

Actual speed and center-to-spacing values for the transfer belts 170, 172 can be calculated or empirically determined based on particular sheeter performance characteristics and specifics of the mold belt 200. The optimal speed of the mold belt and the center-to-spacing of the mold racks 190 in a particular implementation may vary depending on the size of the preforms output from the sheeter, the particular shapes being formed (i.e., attributes of the mold assemblies), the particulars of the forced airflow formation equipment described, etc.

It is noted that there are practical limits on the speed differential of any two adjacent belts as the generally moist, non-rigid preforms are transferred from one to the other. If the difference in speeds are too high, the moist preforms will become elongated or stretched as the transfer occurs, which will negatively affect the shape formation processes. For example, when the sheeted chip preforms are circular, transfer of the sheeted preforms to a belt operating at an excessively high speed relative to the sheeter belt will result in the preforms assuming an oval shape once the transfer is completed. If the oval shaped preform were passed to the formation stage, the shape produced may vary considerably from the shape shown in FIG. 1.

As it is important for the speeds of the sheeter and the associated transfer belts 170, 172 to be established and maintained at constant levels, closed loop feedback controls may be utilized to ensure that the proper speeds are established, controlled and maintained. Alternatively, open loop controls may be implemented if desired.

In an exemplary embodiment, the speeds of the sheeter cutter roller 148 (FIGS. 4-6), the sheeter belt 150, the transfer belts 170 and 172, and the forming belt 200 are coordinated with a servo speed control system in which the speeds of the belts may be electronically interlocked. More specifically, the cutter roller 148 and the belts 150, 170, 172 and 200 may be operated in a cascade mode wherein the speeds of the sheeter belt 150 and the transfer belts 170, 172 are operated as a predetermined ratio of the speed of the forming belt 200. Exemplary speeds and ratios for one contemplated cascade mode are set forth in Table 1 below.

TABLE 1

Exemplary Servo Speed Control Parameters

| Belt | Speed | Speed Ratio |
| --- | --- | --- |
| Sheeter cutter roller 148 | 106.6 fpm | 0.93 |
| Sheeter belt 150 | 99.6 fpm | 1.07 |
| Transfer belt 170 | 106.3 fpm | 1.11 |
| Transfer belt 172 | 117.8 fpm | 1.06 |
| Forming belt 200 | 125 fpm | 1.00 |

The values shown in Table 1 are exemplary only. It is understood that other values, both greater and lesser, may be utilized in other embodiments. Also, it is noted in this example that the second transfer belt 172 speed is lower then (rather than higher than) the speed of the first transfer belt 170, and further that the speed of the second transfer belt 172 is higher than (rather than lower than) the speed of the forming belt. Other variations are, of course, possible wherein different relative speeds of the belts can produce a similar end result of synchronization. Further, it is understood that in some embodiments, more than one of the belts may be run at the same speed, such as the transfer belt 172 and the forming belt 200, while still achieving synchronization of the sheeted preforms 180 with the spacing of the mold racks 190.

When in the cascade mode, the forming belt speed may be adjusted upwardly or downwardly with the remaining belts automatically adjusted based on the predetermined speed ratios relative to the forming belt speed. As such, the forming belt 200 in the cascade mode is a master element, and the cutter roller 148, the sheeter belt 150 and the transfer belts 170 and 172 are slave elements. The forming belt speed, in contemplated embodiments, may be varied from about 100 fpm to about 120 fpm in the cascade mode, although other speeds are possible. In different embodiments, the cascade mode speeds or ratios for the various belts may be predetermined and saved in a controller memory element in a lookup table. Alternatively, a controller may automatically determine the belt speeds and calculate the speed ratios whenever the cascade mode is entered. As such, the manufacturing line operators may set up the belts to their preferences, or make adjustments to the belt speeds for optimization, which are then incorporated into the cascade mode that is based on current operating conditions rather than preset parameters.

It is believed that those in the art could implement such an appropriate control system implementing the cascade mode using processor-based control devices and equivalents without further explanation. It is also contemplated that the speed control system could be selectively activated or deactivated to allow independent, manual control of the cutter roller 148 and the belts 150, 170, 172 and 200 as desired. That is, the cascade mode may be selectively activated or deactivated based on user preference.

It is understood that depending on how large the adjustment to the centerline-to-centerline spacing of the preformed rows on the sheeter belt 150 needs to be to match centerline-to-centerline spacing required by the mold racks 190 in the forming stage 126, greater or fewer numbers of transfer belts may be used. In cases where the sheeter belt 150 centerline-to-centerline spacing matches the centerline-to-centerline spacing of the mold racks 190 at the forming stage, no transfer belt would be needed.

As shown in FIG. 7, the spacing and alignment of the preforms 180 in the rows themselves does not change among the different belts 150, 170 and 172 feeding the rows to the mold belt 200. The spacing of the preforms 180 in each row is dictated by the sheeter 140 and is not changed by the transfer belts 170, 172. As such, no alignment features apart from the sheeter 140 are necessary to align or realign the rows of preforms 180, and cost savings are realized over known systems that necessarily must align or realign the rows of preforms at various stages in the manufacturing process. Rather, in the systems and methods now proposed, the spacing requirements within each row of preforms 180 to match the spacing requirements of the molds racks 190 is contemplated in the design of the mold racks 190 downstream from the sheeter 140. That is, the spacing of the mold assemblies, described below, that are coupled to the mold racks 190 is selected to match the spacing of the preforms 180 in the rows output by the sheeter 140 on the sheeter belt 150. By eliminating any need to re-align the rows of preforms 180 in the production line, less sophisticated control features may therefore be utilized at lower cost, while still ensuring alignment of the preforms 180 with the mold racks 190 and the mold assemblies coupled thereto.

As shown in FIG. 8, the transfer belts 170, 172 may further be adjustable in side to side or left to right position relative to the forming belt 200 at the forming stage 126 to counteract any tendency of the belts to "walk" or move in a direction perpendicular to the path of travel of the chip preforms as the belts are used, indicated by the arrow A in FIG. 8. In particular, the transfer belt assembly includes a support shaft 174 at one thereof. The support shaft 174 is movable in the direction perpendicular to arrow A, as indicated via the arrow B, via a bearing and an actuator.

Sensors and the like, such as machine vision systems described further below, may be used to detect misalignment of entire rows of chip preforms with the mold racks 190 in real time. As previously noted, the perform spacing in each row of sheeted preforms 180 is not adjusted anywhere in the production line after sheeting occurs. Thus, if the transfer belts begin to walk in a lateral direction by a sufficient amount, the rows of preforms 180 will become oblique to the mold racks 190 on the forming belt 200. In other words, the centerlines of the sheeted preforms 180 remain aligned in each row, but the centerlines of the rows may assume an angle with respect to the centerlines of the mold racks 190 on the forming belt 200. This contrasts prior art systems wherein individual ones of the preforms in each sheeted row can become misaligned in the row, and steps must accordingly be taken to realign the row prior to forming of the preforms on mold racks.

If such angular misalignment of the rows of preforms 180 is detected, the relative position of the transfer belt assembly vis-à-vis the forming stage 126, and specifically the forming belt 200, may be readjusted in response to feedback from the sensors. Specifically, by moving the support shaft 174 in the direction of arrow B as needed, the transfer belt assembly may be pivoted to re-align the transfer belts 170, 172 with the forming belt 200 so that there is no angular misalignment between the centerlines of the preforms rows and the centerlines of the mold racks 190. Therefore, by pivoting the transfer belt assembly, proper centering of the preforms 180 with the mold racks 190 at the forming stage can be ensured even as the belts walk in the lateral direction. Alignment of the preforms 180 transferred to the forming stage 126 may accordingly be maintained for longer periods of time without having to shut down the entire production line for readjustment.

In further embodiments, a belt tracking system may be utilized to automatically compensate for belt walking issues. Such a belt tracking system may obviate any need to pivot the transfer belts as described above.

Additionally, the transfer belt 170 may also be axially or longitudinally movable relative to the transfer belt 172 in a direction parallel to arrow A such that a gap G may be opened and closed between the facing ends of the two belts 170, 172. Creating such a gap G may be particularly beneficial when starting up or otherwise troubleshooting the system. By moving the belt 170 relative to the belt 172 in a direction opposite to arrow A and the path of travel of the preforms when the belts are used, a gap G between the ends of the belts 170 and 172 may be opened and created. Likewise, by moving the belt 170 in the direction of arrow A and the path of travel of the preforms when the belts 170, 172 are used, the gap G between the belts 170, 172 may be closed as shown in FIGS. 8 and 9.

When the gap between the belts 170 and 172 is created, the sheeted preforms on the belt 170 are prevented from being transferred to the belt 172. Rather, the sheeted preforms may fall into the gap and be collected as waste, or optionally may be collected and returned to other side of the sheeter. Either way, the creation of the gap G prevents the sheeted preforms 180 from passing through the remainder of the system. When the gap G between the belts 170, 172 is closed, the sheeted preforms 180 will again pass through the forming stage 126. By opening and closing the gap G, the forming stage 126 can be operationally bypassed or restored, while producing minimal scrap product. Appropriate actuators and controls may be provided to open or close the gap G in response to input by a human operator, or in an automated manner that does not require human input or intervention. Such control of the gap G may also be coordinated with other sensors and the like detecting misalignment of the preforms in the various formation stages, or other error conditions.

While the gap G as described above is opened and closed between the two transfer belts 170 and 172, the gap could be implemented at another location with similar effect. For example, the gap G could be opened or closed between the transfer belt 172 and the mold belt 200, or between the sheeter belt 150 and the transfer belt 170. If desired, more than one gap could be implemented to interrupt designated portions of the production line.

For even further flexibility, the forming belt 200 of the forming stage 126 may be movable in the direction of arrow A toward and away from the transfer belt 172 to provide further adjustment of the system to achieve the proper centerline-to-centerline spacing of the rows of preforms delivered to the forming belt 200. Such adjustment of the forming belt 200 relative to the transfer belt 172 may be accomplished manually by a human operator or automatically in response to detected conditions. In particular, the ability of forming belt 200 relative to the transfer belts allows fine tuning of the centerline spacing of the mold racks 190 on the forming belt 200 relative to the centerline spacing of the sheeted rows of preforms 180 without necessarily having to change the speed of the belts as discussed above.

Figure 10:
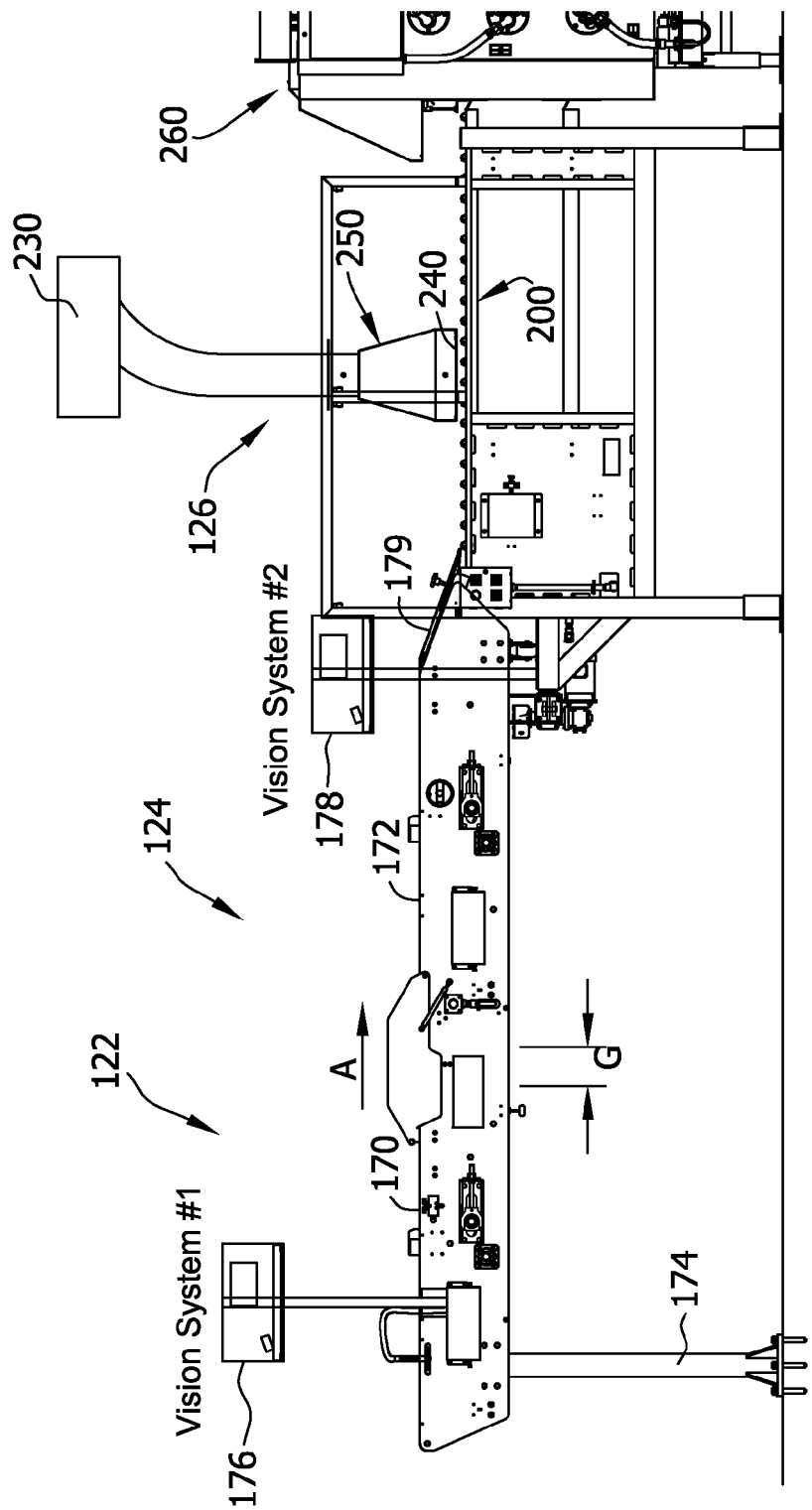
FIG. 10 is a side elevational view the transfer belts shown in FIG. 7 and a portion of the forming stage equipment.

FIG. 10 shows the transfer belts 170, 172 in side elevational view feeding into the forming station 126 and the forming belt 126. Rows of preforms 180 (FIG. 7) are conveyed from the sheeter 140 (FIG. 4) in the forming sheeting stage 120 on the transfer belts 170, 172 in the direction of arrow A. Machine vision systems 176 and 178 are provided and monitor a presence and alignment of the rows of preforms 180 on the transfer belts 170, 172. While two vision systems 176, 178 are shown with two transfer belts 170, 172 it is understood that greater or fewer numbers of vision systems 176, 178 may be utilized, and that the number of vision systems and the number of transfer belts need not be the same.

The machine vision system 176 monitors preforms 180 supplied by the sheeter belt 150 (FIGS. 4 and 7) and transferred to the first transfer belt 170. If preforms 180 are not detected, if the rows preforms 180 are misaligned, or if some other abnormality is detected, the machine vision system 176 can communicate with a controller and cause automatic interruption of the system by opening the gap G as described above to bypass the forming stage, or otherwise generate sufficient alarms and the like for response by human operators.

The machine vision 178 monitors the flow of preforms from the second transfer belt 172 to the forming belt 200. If the rows of preforms 180 become angularly misaligned, the machine vision system 178 can communicate with a controller and cause automatic adjustment of the transfer belt position in the direction of arrow B (FIG. 8) as discussed above and/or adjust the position of the forming belt 200 relative to the transfer belt by moving the forming belt 200 in a direction parallel to the arrow A.

A variety of machine vision systems suitable for the systems 176 and 180 are known and may be used to effect the functionality described without further explanation. The transfer belts 170, 172 may have a contrasting color to the sheeted dough utilized to improve the performance of the machine vision systems. The vision systems 176 and 180 advantageously provide real time feedback and automatic adjustment capabilities to minimize downtime of the system and minimize scrap product. In certain embodiments, however, the machine visions systems 176, 180 may be considered optional and may be omitted.

Figure 11:
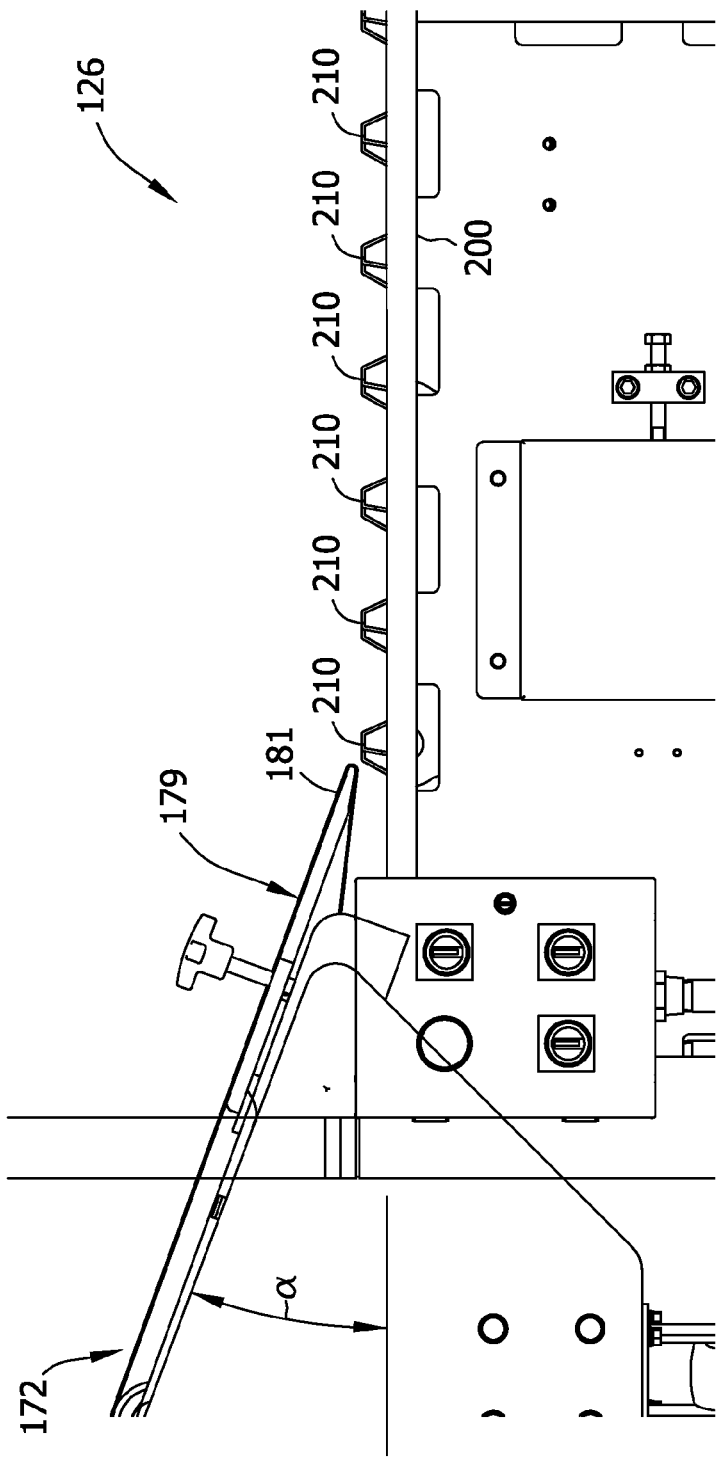
FIG. 11 is a magnified view of a portion FIG. 10.

As also shown in FIG. 10, and as shown in greater detail in FIG. 11, the second transfer belt 172 includes an inclined end section 179 that delivers the preforms 180 to mold assemblies 210 carried on the mold belt 200. The inclined section 179 of the transfer belt 172 extends at angle α relative to a horizontal plane as shown in FIG. 10 that is established by the upper portion of the forming belt 200 that carries the mold assemblies 210. In other words, the longitudinal axis of the inclined section 179 extends at angle to the longitudinal axis of the forming belt 200. In an exemplary embodiment, the angle α is about 20°, although greater or lesser angles could be utilized in other embodiments. The angle α facilitates placement of the moist preforms on the mold assemblies 210 without ripping or tearing. While an exemplary angle α has been described, it is recognized that other angles both greater and lesser may be utilized, and accordingly the inclined end section 179 may be adjustable to different angles. It is also contemplated that in some cases the angle α may be zero. That is, the inclined end section 179 of the transfer belt 172 may be considered optional in some embodiments and accordingly may be omitted.

The inclined end section 179 also includes a tapered end 181, sometimes referred to as a nosebar that provides a reduced radius where the belt turns and enhances peeling of the preforms from end section 179, allowing the preforms 180 to fall a small distance prior to landing on the mold assemblies 210.

FIG. 12 illustrates a placement of one of the preforms 180 on a mold assembly 210 after delivery from the transfer belt 172. As shown in FIG. 12, at the forming stage 126 a sheeted, non-rigid moist dough preform 180 is transferred from the belt 172 onto the mold assembly 210 in a generally centered position on the mold assembly 210. As each preform 180 is transferred to one of the mold assemblies 210, the center portion of the preform 180 is supported by the flat top section of the mold assembly 210 such that the center portion of the perform 108 is maintained in a generally flat or planar shape.

The outer portions or peripheries of the preform 180, however, naturally drape over the exterior of the mold assembly 210 under their own weight. The outer peripheries of the preform 180 contacts an outer or exterior surface of the mold assembly 210, but because of the structure of the mold assembly 210 a portion of the preform 180 is allowed to sag inwardly, thereby providing for both convex and concave curvature in the side wall 104 (FIG. 1) of the shaped chip. Convex curvature is formed in areas where the preform 180 is supported by the mold assembly 210, and concave sections are formed in the areas of the mold assembly 210 where the preform 180 is generally unsupported.

As also shown in FIG. 12, to further enhance the shaping of the moist dough preforms 180, and also to ensure uniformity of shaping, a blower 230 is provided to generate forced airflow through a directional orifice plate or manifold 240 to provide directional airflow to the outer surfaces of the preform 180 once placed on the mold assembly 210 as shown. Orifices 242, 244 and 246 are shown in FIG. 8 that are angled differently relative to one another to direct air pressure to various portions of the exposed outer surface of the preform 180 as shown by the directional arrows in FIG. 8. Greater or fewer orifices may be provided in the manifold 240 to direct airflow to the same or different locations shown in FIG. 8, and further manifold details are discussed below. The angles of the orifices 242, 244, 246 may be the same or different as desired in various embodiments. Additionally, the air in contemplated embodiments is filtered via applicable food processing regulations prior to being forced through the manifold 240. In one example, the vertical distance from the top of the mold assembly 210 and the lower edge of the manifold 240 is rather small to facilitate shaping with lower blower speeds, and is on the order of about 1.5 inches, although greater and lesser values may be employed as desired.

Figure 13:
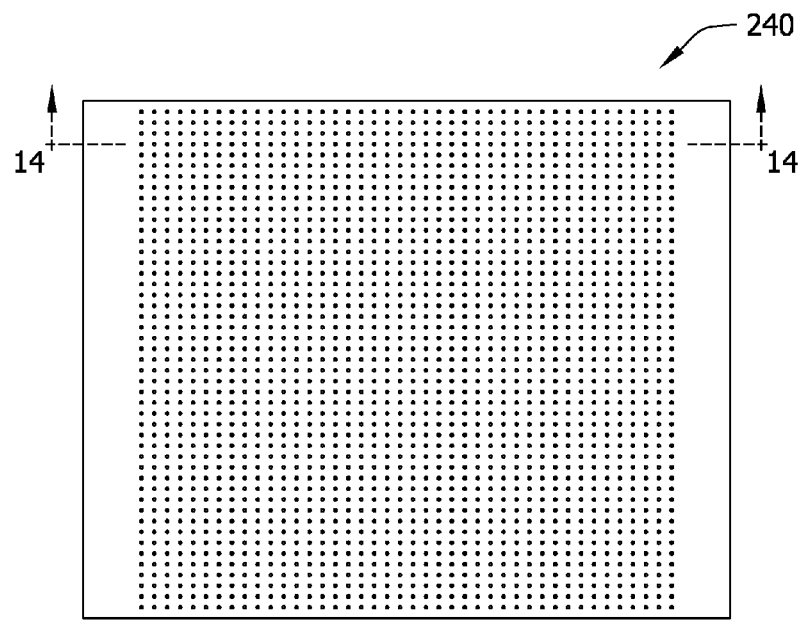
FIG. 13 is a top view of an exemplary embodiment of a directional airflow manifold for the forming stage processes shown in FIG. 23.
Figure 14:
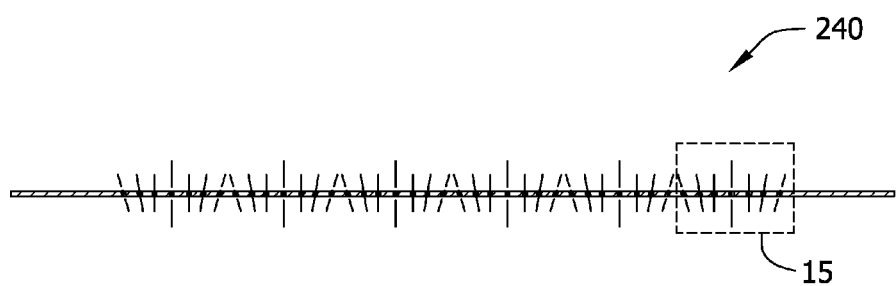
FIG. 14 is an end view of the manifold shown in FIG. 13.
Figure 15:
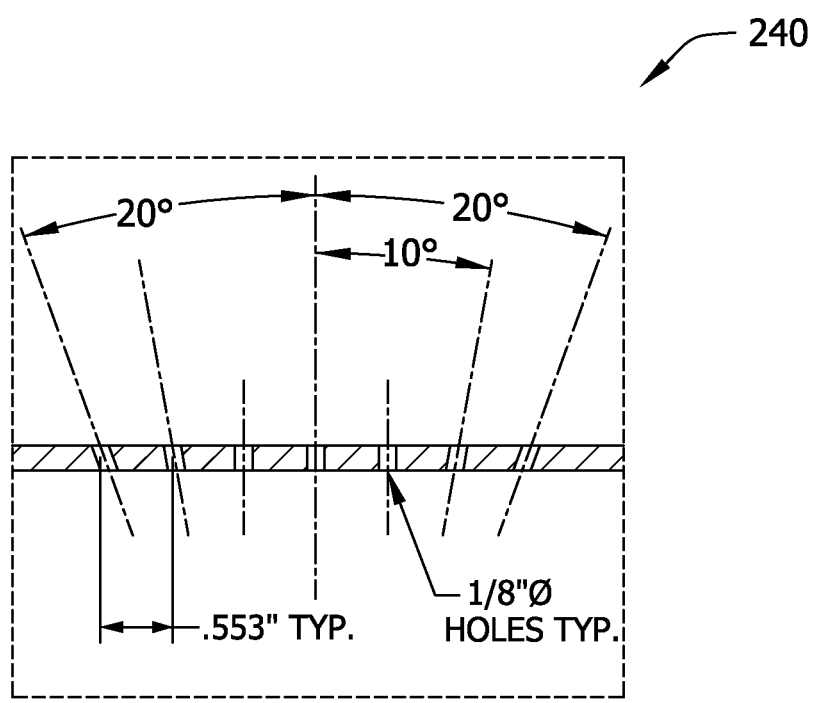
FIG. 15 is a partial sectional detail view of a portion of the manifold shown in FIG. 14.

Additional views of the manifold 240 are shown in FIGS. 13-15 and as shown therein the plate includes a multitude of orifices oriented in patterns of orifices angled in different orientations (as detailed in FIG. 15) that are repeated across the length of the plate. The manifold 240 is dimensioned such that a large number of mold assemblies 210 carried on multiple mold racks (described below) coupled to the forming belt 200 may pass under the manifold 240 for simultaneous, air-assisted shape formation. Each of a plurality of mold assemblies 210 carried on the mold racks will pass under respective patterns of directed orifices in the manifold 240 as detailed in FIG. 15, wherein it can be seen that seven different orifices are provided to direct air around various portions of a mold assembly 210 and achieve the shape shown in FIG. 1. Exemplary dimensions are also shown in FIGS. 13-15, and it is understood that greater and lesser dimensions and different configurations of the manifold 240 may be utilized in various further and/or alternative embodiments. The manifold 240 may be fabricated from stainless steel or another suitable material known in the art.

Advantageously, a single blower 230 or relatively small number of blowers can be used with a manifold 240 (or manifolds) of sufficient size to simultaneously provide directed airflow to many mold assemblies 210 of multiple mold racks as they are moved along the forming belt 200 toward an oven 260 (also shown in FIGS. 3, 8, 9 and 10). Various geometric orientations of airflow may be directed at the same or different areas of the preforms as they pass under the manifold 240 in various embodiments. The air-assisted formation process is sometimes referred to as a non-contact method of shaping the preforms 180. Contact methods involving mechanical plungers and the like making actual physical contact with the individual preforms 180 and molds to shaped the preforms are entirely avoided in favor of a much simpler, lower cost and yet highly reliable airflow assembly. Coupled with gravitational forces, such non-contact, air-assisted shaping systems and methods can capably produce shaped edible food articles with relatively low cost that conventional manufacturing and systems utilizing contact methods of formation cannot.

Figure 16:
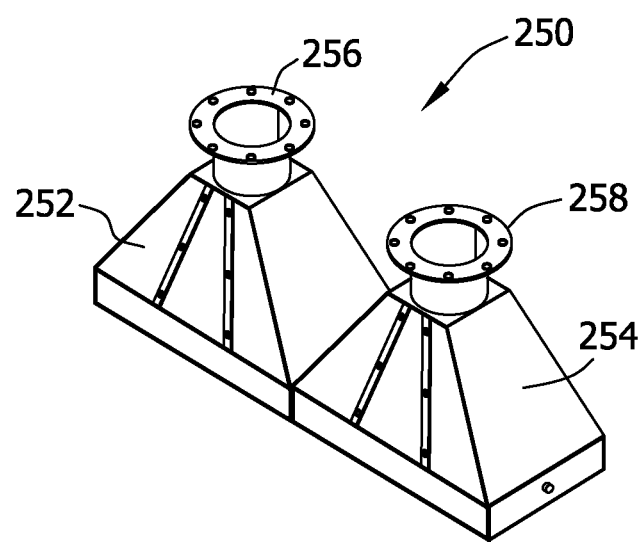
FIG. 16 is a perspective of an airflow plenum assembly for the manifold shown in FIGS. 13-15.
Figure 17:
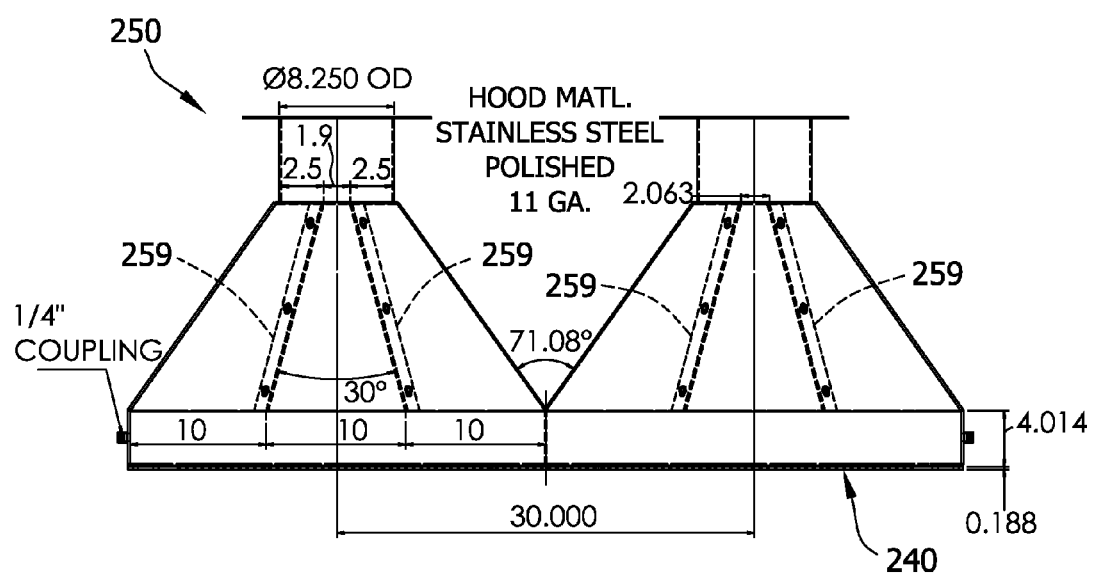
FIG. 17 is side sectional view of the plenum assembly shown in FIG. 16.

FIGS. 16 and 17 illustrate an exemplary airflow plenum assembly 250 for directing airflow through the manifold 240. The assembly 250 includes dual plenum housings 252, 254 each provided with a coupler 256, 258 for establishing direct or indirect fluid communication with one or more blowers 230 (FIGS. 10 and 12). As shown in FIG. 17, internal airflow baffles 259 may be provided in each plenum housing 252, 254. The plenum housings 252, 254 and baffles 259 advantageously facility equalization of airflow to the various portions of the manifold 240 coupled to the lower end of the plenum assembly 250. Ideally, the blowers are run at the lowest possible speed to positively facilitate shaping of the preforms while minimizing any chance of tearing the preforms as they are being shaped.

Greater or fewer plenum housings may be provided in other embodiments, other configurations of plenum assemblies may be provided for other purposes, and in some embodiments a plenum assembly may be considered optional and my be omitted altogether.

Referring back to FIG. 12, to further facilitate the gravitational, non-contact forming process, a moisturizer element 280 is optionally provided prior to delivery of the preforms 180 to the forming stage 126. In contemplated embodiments, the moisturizer element 280 is configured to provide a fine mist or spray of water 282 directed upon the preforms 180 as they are carried toward the forming stage. The moisturizer element 280 re-hydrates the preform 180 for optimal shaping under the gravitational and air assisted processes as described above. The moisturizer element 280 therefore ensures that the preform 180 is transferred to the forming stage in a moist, non-rigid state that is both more amenable to shaping processes at the forming stage and less resistance to tearing as the preforms are transferred onto the mold assemblies 210. The moisturizer element 280 is believed to be particularly advantageous when the sheeted moist dough preforms 180 travel at a sufficient speed for a sufficient distance between the sheeter stage and the forming stage that some drying of the preforms 180 occurs. The desirability of the moisturizer element 280 may vary depending on the particular formulation of dough utilized, belt speeds, and other factors, and in some cases may not be need and can be omitted.

In contemplated embodiments, the dough preforms 180 are shaped on the mold assemblies 210 in the same raw, moist, non-rigid state the dough is in when sheeted in the sheeting stage 120, rather than in a partially rigidified state as in known systems and methods for making shaped snack chips. Forming raw, moist dough preforms 180 facilitates the upside down formation process as the non-rigid dough is largely shapeable under its own weight and with some assistance of forced airflow as described above into rather complex shapes with a relatively simple mold assembly. The shaping of the moist dough preforms 180, however, tends to introduce other manufacturing challenges. In particular, the raw, moist dough tends to stretch, tear and deform when manipulated by industrial equipment.

Figure 18:
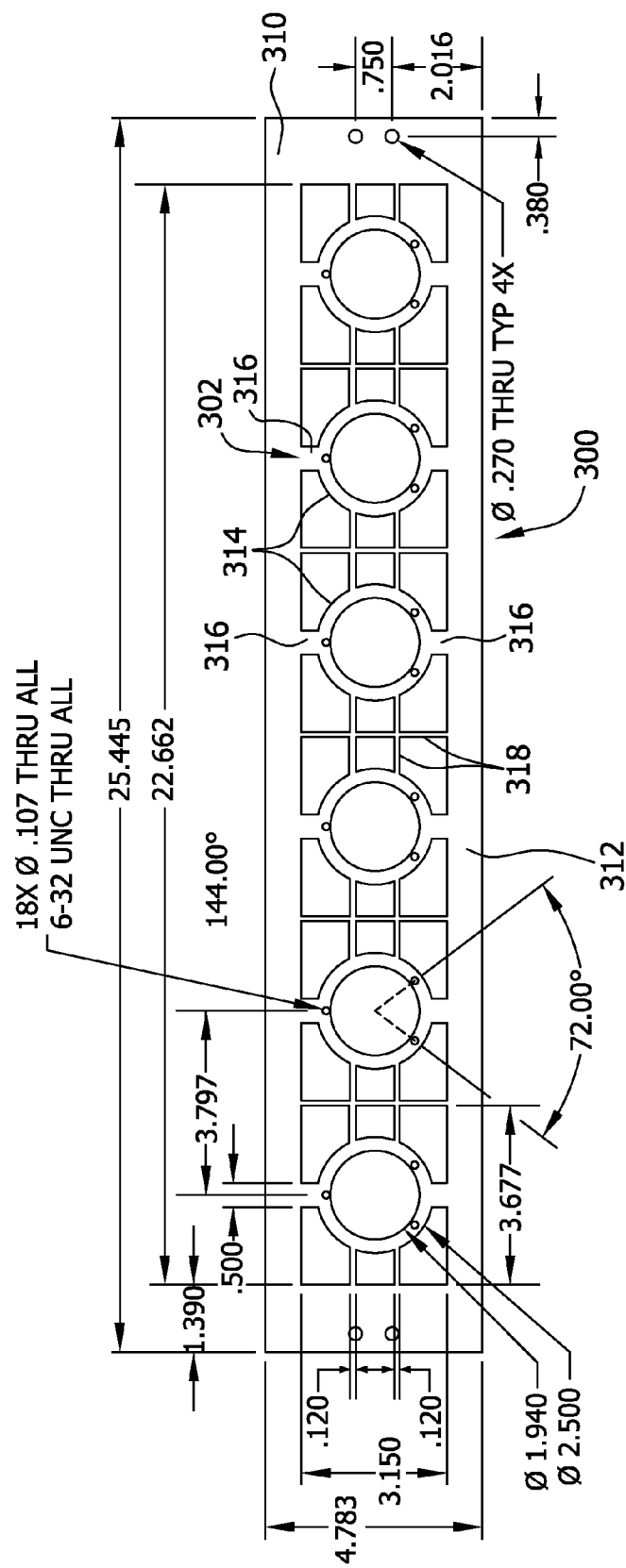
FIG. 18 is a top view of a first exemplary embodiment of a mold rack channel for the forming stage.
Figure 19:
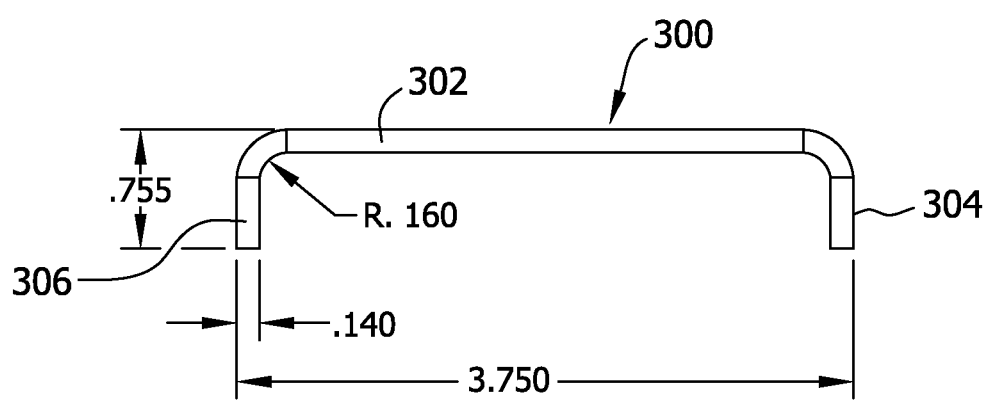
FIG. 19 is an end view of the exemplary mold rack channel shown in FIG. 18.
Figure 20:
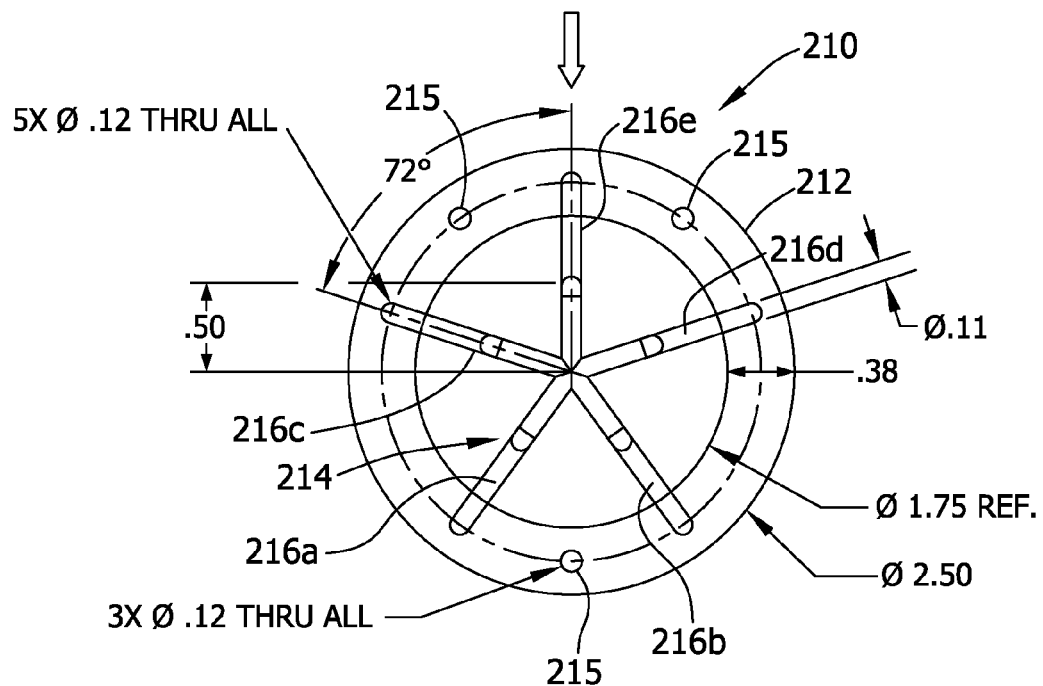
FIG. 20 is a top view of a first exemplary mold assembly for the mold rack shown in FIGS. 18 and 19.

FIGS. 18 and 19 respectively illustrate in top view and end view a first exemplary mold rack 300 that may be utilized as the mold rack 190 on the forming belt 200 in the production line as described above. The mold rack 300 in the exemplary embodiment shown is formed into a U-shaped channel configuration having a top section 302 and legs 304 and 306 depending at opposite edges of the top section 302 in a substantially perpendicular manner to the top section 302. The legs 304 and 306 as shown in FIG. 20 are relatively short such that the channel formed by the rack 300 is much wider along the top section 302 than the legs 304, 306 are high. Other arrangements are, of course possible in different embodiments.

As shown in FIG. 18 the top section 302 includes elongated and generally parallel side rails 310 and 312, a series of annular collars 314 generally centered between the side rails 310 and 312, bridge connector sections 316 interconnecting the collars 314 to the side rails, and intersecting grid portions 318 interconnecting the collars 314 and the side rails 310, 312. The side rails 310, 312 are generally solid elements having no openings therein, while the remainder of the mold rack 300 between the side rails 310, 312 is open except where the collars 314, the bridge connector sections 316 and the grid portions 318 reside. This is perhaps best seen in FIG. 23 where the mold rack 300 is shown in perspective view. The open design of the mold rack 300 facilitates airflow through and around the mold rack 300 in the oven 260 (shown in FIGS. 3, 8, 9, 10 and 12). More efficient drying of the shaped food articles in the oven 260 is therefore facilitated by providing minimal impeding of airflow in the mold rack design.

The rack is generally lightweight and may be formed from known materials such as carbon steel in one example according to known techniques. Notably, the top section 302 is generally flat and planar (i.e., has a constant and uniform thickness with the opposed major surfaces in spaced apart but parallel planes), unlike some known mold racks having integrated, single piece molding forms with contoured, out of plane extensions and legs defining three dimensional mold shapes. The rack 300 because of its relatively simplicity, is accordingly much easier and less expensive to manufacture than conventionally used mold racks.

Figure 21:
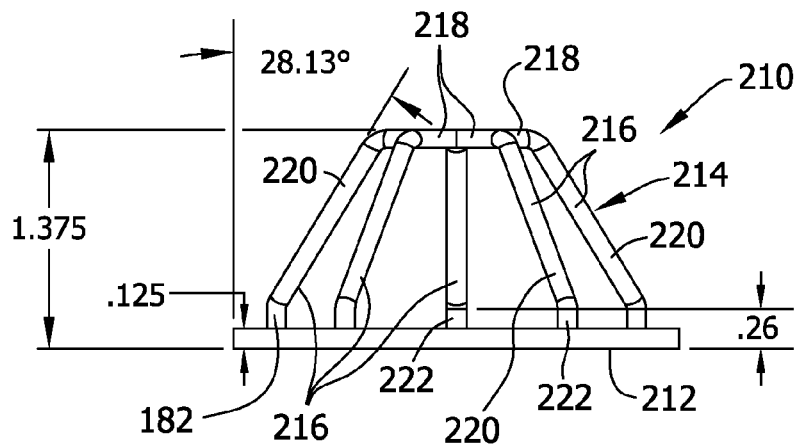
FIG. 21 is a side elevational view of the mold assembly shown in FIG. 20.

FIGS. 20 and 21 respectively are a top view and side elevational view of an exemplary mold assembly 210 attachable to the mold rack 300 shown in FIGS. 18 and 19. The mold assembly 210 generally includes a base 212 and a shaped body 214 attached to the base 212.

The base 212 is generally complementary in shape to the collars 314 (FIGS. 3 and 14-15) formed in the mold rack 300, and in the exemplary embodiment shown the base 212 extends as an annular ring. Other shapes are of course possible for both the mold base 212 and the collars 314 in the mold racks 300. The mold base 212 defines a generally universal mounting platform for attaching the mold assembly 210 to the mold rack 300. As seen in FIG. 20, mounting holes 215 are provided in the mold base 212 for securing the mold base 212 to one of the collars 314 in the mold rack 300 using known fasteners.

Not only may the base 212 be simply attached to a mold rack, but it may be rather simply removed. Individual installation and removal of the mold assemblies 210 from the mold rack 300 is advantageous as the mold assemblies 210 can be selectively removed and replaced as needed or as desired, while still allowing the remainder of the mold rack 300 and mold assemblies 210 to be used. Unlike conventional, single piece mold racks, the mold rack 300 is highly serviceable and adaptable for different uses by simple removal and replacement of the mold assemblies 210. It is further possible, as explained below, to attach mold assemblies providing for different shapes to the processed food articles to the same mold rack, such that snack chips, for example, having different shapes can simultaneously be produced.

The shaped body 214 in the example shown is a wire basket including five arms 216 joined to the mold base 212 at one end and to each other at their opposing ends. In the exemplary embodiment shown, five arms 216 are provided in a spoke-like pattern resembling a star-shape as best seen in FIG. 20. The arms 216 are equally angled relative to one another from a center point where the arms 216 meet one another, and in the example shown the arms 216 are spaced about 72° from one another around the circumference of the base ring 212. It is contemplated that different spacing of arms 216, including unequal spacing of arms, and also different numbers of arms 216 could alternatively be provided in other embodiments. The arms 216 may be rather easily formed from known materials such as carbon steel via known techniques, and may be attached to the mold base 212 using known fastening techniques. Mounting holes may be provided in the mold base 212 to receive ends of one or more of the arms 216.

As best shown in FIG. 21, the arms 216 may further include generally coplanar top sections 218 extending substantially parallel to but spaced from the mold base 212, angled sections 220 extending downwardly and outwardly away from the top sections 218 toward the mold base 212, and mounting sections 222 extending substantially perpendicular to the mold base 212. The mounting sections 222 may be received in mounting holes in the mold base 212, allowing the arms 216 to be securely connected thereto. The arms 216 provide a framework for providing the shape shown in FIG. 1 to a moist dough preform, but in an inverted or upside-down orientation as described above in relation to FIG. 12. Specifically, the top sections 218 support and form what becomes the base 102 (FIG. 1) in the completed chip, while the angled sections 220 support and define portions of the curvilinear side wall 104 in the completed chip. Other configurations of the arms 216 are possible in other embodiments to provide various alternative shapes.

A plurality of mold assemblies 210 may be assembled to a plurality of mold racks 300 for shaping of moist dough preforms 180 in a batch process. The mold bases 212 may be attached to the collars 314 in the mold rack 300 using known fastening techniques. The shaped bodies 214 project upwardly from the mold rack 330 and define generally inverted cup-shaped mold forms for making shaped snack chips. The cup-shaped forms extend upwardly from the top section 302 of the mold rack 300, rather than downwardly extending bowl-shaped forms conventionally used in known manufacturing systems and methods. The upward extension of the molds facilitates a simpler construction of the mold belt to 200 which the mold rack 300 is mounted and provides for further cost savings.

Figure 22:
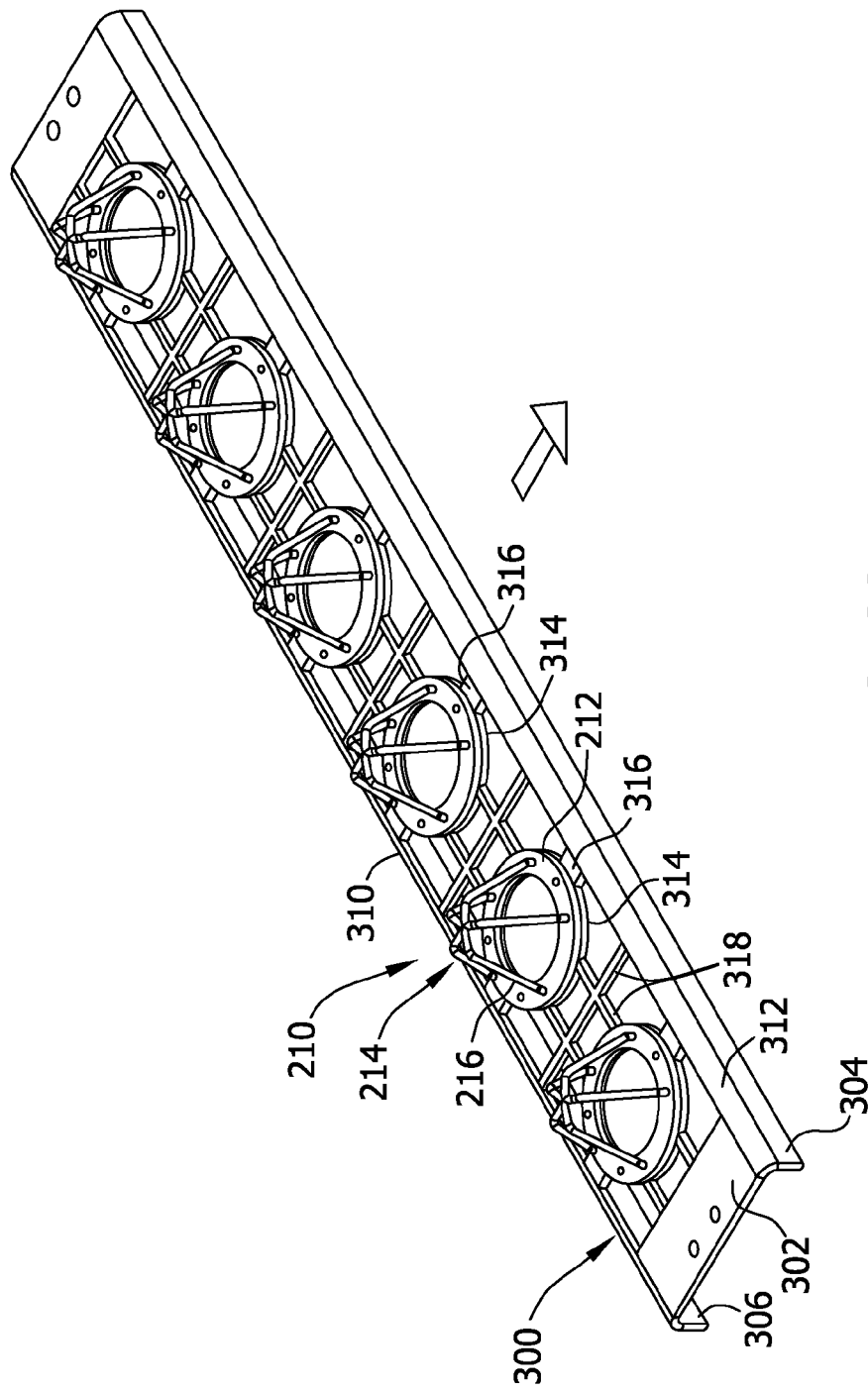
FIG. 22 is a perspective view of the mold rack shown in FIGS. 18 and 19 assembled with a plurality of mold assemblies shown in FIGS. 20 and 21.

As shown in FIG. 22, six mold assemblies 210 are assembled with a single rack 300, such that multiple chip preforms 180 can be simultaneously formed on the shaped bodies 214 including the arms 216. While six mold assemblies 210 are shown in FIG. 22, in other embodiments including those described below the mold rack could include, for example, fourteen mold assemblies 210 for increased production capacity. Greater or lesser numbers of mold assemblies 210 may be provided in other embodiments as desired. A plurality of mold racks, each equipped with a plurality of mold assemblies 210, may be provided and coupled to the forming belt 200 that moves the mold racks at a predetermined speed as the moist, non-rigid preforms 180 are shaped and subsequently passed through the oven 260. In one contemplated embodiment, the mold racks 300 are coupled to a chain and sprocket-type forming belt with known fasteners such as bolts.

The arms 216 of the mold assembly 210 provide a relatively small surface area for contact with a respective moist dough preform 180 as it is being shaped, but still provides the necessary support so that the respective preforms 180 can be shaped without tearing. When the arms 216 are arranged in the star-shaped, spoke-like pattern shown in FIGS. 21-23 the preforms 180 may be shaped into relatively complex shapes having outwardly flared or tapered side surfaces including a wavy side surface profile with both convex and concave surfaces as shown in FIGS. 1 and 12. Other arrangement of the arms 216 would accordingly provide other shapes to the food product, whether simpler or even more complex than the shape of the article shown in FIG. 1.

Because of a tendency of the moist dough preforms 180 to tear when being handled, the mold assemblies 210 in one contemplated embodiment are arranged to ensure multiple points of initial contact with a preform 180 as it is deposited on the mold assembly 210. Referring back to FIG. 20, one way to do this is to face the mold assembly 210 so that two of the arms 216 are present on the leading edge of the mold assembly 210 as the preform 180 is placed upon the assembly 210.

Thus, in the example shown in FIG. 20, if the mold assembly 210 follows a motion path in the direction of the arrow from top to bottom in the plane of the page for FIG. 21, the dual arms 216a and 216b shown on the lower end of the mold base 212 will first contact the preform 180, the middle arms 216c and 216d shown in FIG. 21 and the single arm 216e shown at the top of the mold assembly in FIG. 20 will be the last of the arms 216 to contact the perform 180. The initial dual points of contact at the arms 216a and 216b will generally prevent shearing and tearing of the moist dough preform 180 at the leading end that may otherwise occur if the direction of travel was reversed and the single arm 216e shown at the top of FIG. 20 was the sole initial point of contact with leading edge of the preform 180.

It is contemplated that depending on the speed at which the moist dough preforms 180 are deposited on the mold assemblies 210, and also dependent on the properties of the dough formulation utilized, additional structure support in the mold assembly 210 may be desired. If so, wire mesh materials and the like (not shown) may optionally be provided and extended over the arms 216 to increase surface contact with the preforms 180 as they are deposited on the mold assemblies 210 and shaped. It is further contemplated that such wire mesh materials and the like could perhaps negate a need for the arms 216 altogether if the material was sufficiently sturdy and structurally sound to retain its shape and withstand the rigors of mass production processes without the structural support of the arms. The wire mesh materials and the like may also be shaped to provide a different shape to the preforms 180 than the arms 216 themselves otherwise produce. The molds may be stamped and shaped into a practically endless variety of shapes imparting different end shapes to the preforms 180. Non-limiting examples of potential alternative shapes to the star-shaped chips as shown and described provided by the molds may include a Sombrero hat shape, a pirate hat shape, a soup bowl shape, and a taco shell shape.

The exemplary upside-down formation system and methods described are quite versatile. A variety of different sizes and shapes of the snack chips are possible using the basic system and methodology described, without significant alteration of the equipment utilized. The mold racks 300 are rather simply constructed and easily assembled with different configurations of mold assemblies 210. Mold assemblies 210 of different shapes may be provided to the same or different mold racks 300 to simultaneously form differently shaped chips, which may be packaged together as variety packs for the use and enjoyment of consumers. Mold racks 300 having differently shaped mold assemblies 210 may rather easily be swapped out to quickly convert the manufacturing line to produce different shapes of chips. Likewise, a wire mesh material and the like may be used with otherwise existing mold assemblies 210 to easily vary the shapes of the chips produced without having to remove the mold racks 300 or the mold assemblies 210 form a mold belt. Likewise, the airflow manifold 240 described above can be replaced with another manifold to provide different effects or to facilitate different shapes of chips.

The formed or shaped preforms 180 may be carried on the inverted cup-shaped molds and mold racks on the forming belt 200 directly to and through the oven 260 to bake the shaped preforms 180. In the oven, the shaped, moist preforms 180 are toasted and dried as they are heated and the resultant moisture removal rigidifies the shaped preforms 180 into freestanding cup-shaped snack chips 100 (FIG. 1) that retain the formed shape. It is recognized that the air-assisted formation techniques described above may also partially dry the shaped preforms 180 as they travel toward the oven. That is, the air-assisted formation process may in some embodiments be considered to simultaneously shape and dry the exterior surfaces of the preforms 180 prior to the baking stage. The degree of drying, and associated rigidity of the shaped preforms 180, in the air-assisted formation stage can be coordinated with the baking stage to provide the optimal moisture level to the chips output from the oven.

As best shown in FIGS. 3 and 8-9, the oven 260 includes first zone 262 and a second zone 264 utilizing different types of heating, and the mold assemblies 210 travel through the zones 262 and 264 on the forming belt 200 in sequence. The oven 262 is believed to be unique and enhances baking and toasting of the preforms 180 after they are shaped. Compared to prior art production lines for manufacturing similar goods that would entail multi-stage manufacturing and transfer of the food product amongst the stages to provide equivalent processing, the combined forming belt 200 and multiple zone oven 262 provides for a simpler and more effective production line.

The first oven zone 262 includes a plurality of ribbon burners and infrared burners arranged in the upper and lower portions of the oven. The ribbon burners in the zone 262 bake and toast the preforms on the mold assemblies 210 as they travel through the oven, and also preheats the mold assemblies 210 as they return to the transfer belt for deposit of additional preforms. In one embodiment, a set point temperature of 800° F. in the lower portion of the first zone 262 provides sufficient preheating of the mold assemblies, although other set points may be selected if desired. Preheating of the mold assemblies 210 is beneficial as it reduces a tendency of the preforms 180 to stick to the mold assemblies. In the upper portion of the zone, the temperature set point is set higher than the lower zone in one embodiment, such as about 850° F.

The second oven zone 264 includes convection heating elements and radiation heating elements. The temperature set point of the convection heating elements is about 350° F. in one example, and the radiant burners in the second zone 264 are run at about half of their maximum temperature.

The first and second oven zones 162 and 164 are directly joined and include the same forming belt 200, thereby providing single pass baking and toasting of the preforms with convection, radiant and direct fire heat sources to efficiently dry the preforms to a desired moisture content for frying. In one example, the weight of the preforms exiting the oven 260 weigh about 4.7 grams apiece.

Figure 23:
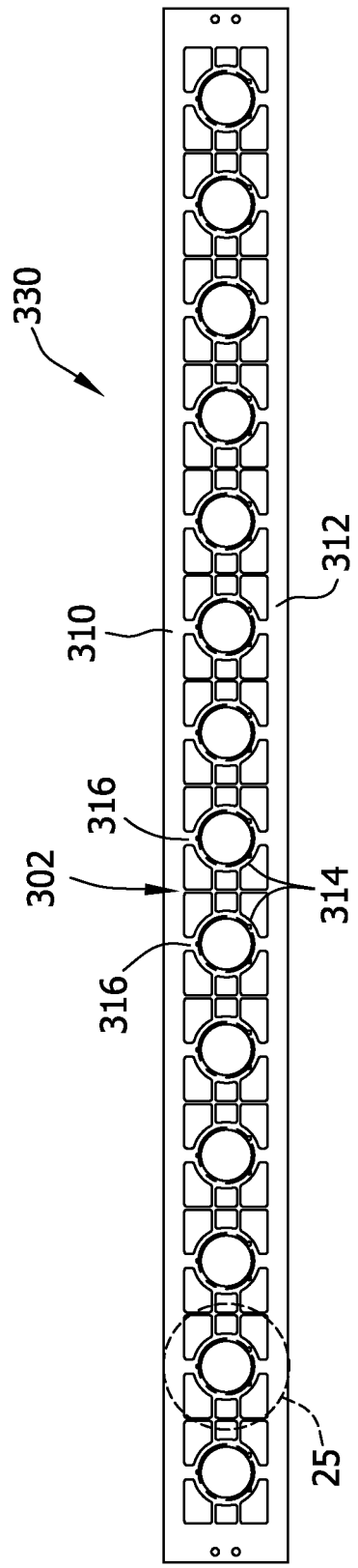
FIG. 23 is a top view of a second exemplary embodiment of a mold rack channel for the forming stage.
Figure 24:
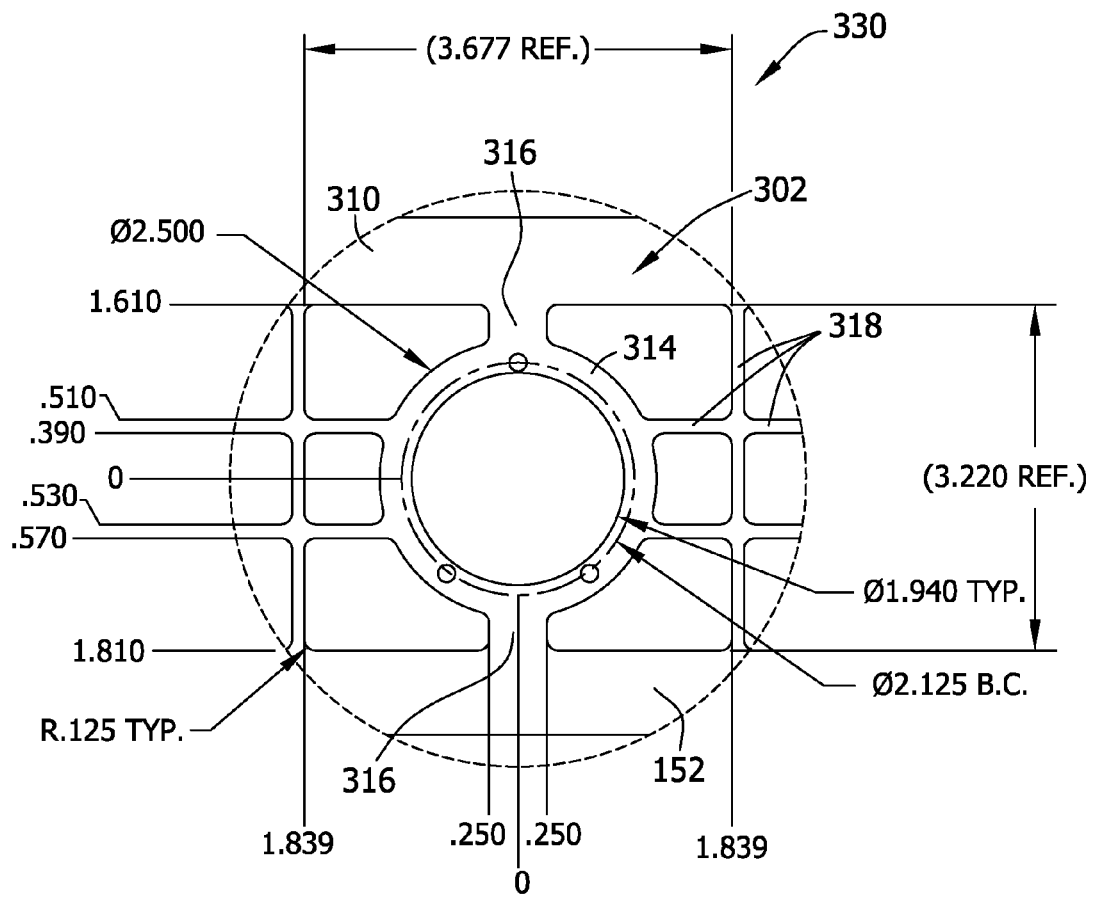
FIG. 24 is a detailed view of a portion of the mold rack channel shown in FIG. 23.
Figure 25:
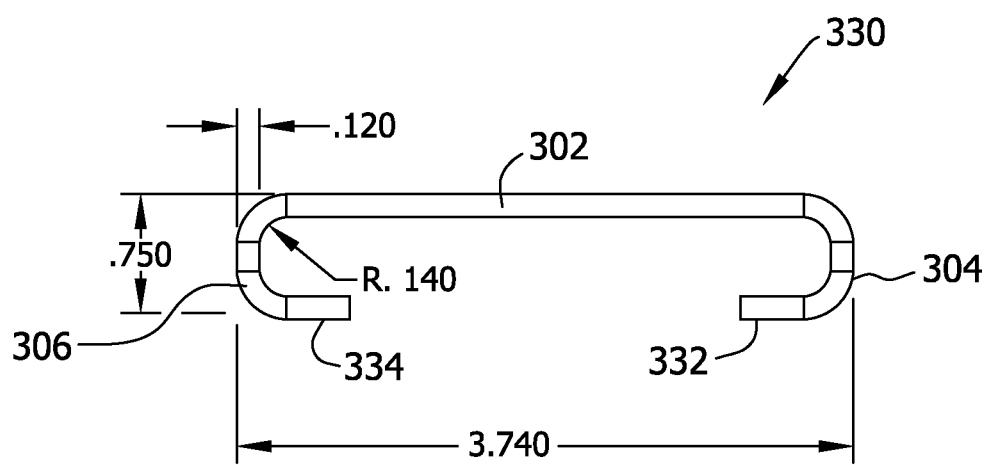
FIG. 25 is an end view of the mold rack channel shown in FIG. 23.

FIGS. 23-25 illustrate in respective top view, detail view, and end view of a second exemplary mold rack 330 that may be utilized in lieu of the mold rack 300 on the forming belt 200. Common features of the mold racks 330 and 300 are indicated with like reference characters.

In the rack 330, and as best seen in FIG. 25, the legs 334 and 306 in the channel configuration further include formed side panels or sections 332, 334 that extend parallel to the plane of the top section 332. The formed side panels 332, 334 provide additional stiffness and rigidity to the rack 330 to ensure that the channel does not deform from its original shape when exposed to wide temperature variations in the baking portion of the forming stage. Ambient temperatures inside portions of the oven 260 may reach 850° F. in contemplated embodiments, while at other portions of the oven considerable temperature variations may exist. The rack 330 better withstands thermal cycling and expansion issues when cyclically heated in the oven. The exemplary channel configurations shown are exemplary only. Additionally, while exemplary dimensions are shown in the Figures such dimensions are exemplary only. Greater and lesser dimensions may be employed in various further and/or alternative embodiments.

Figure 26:
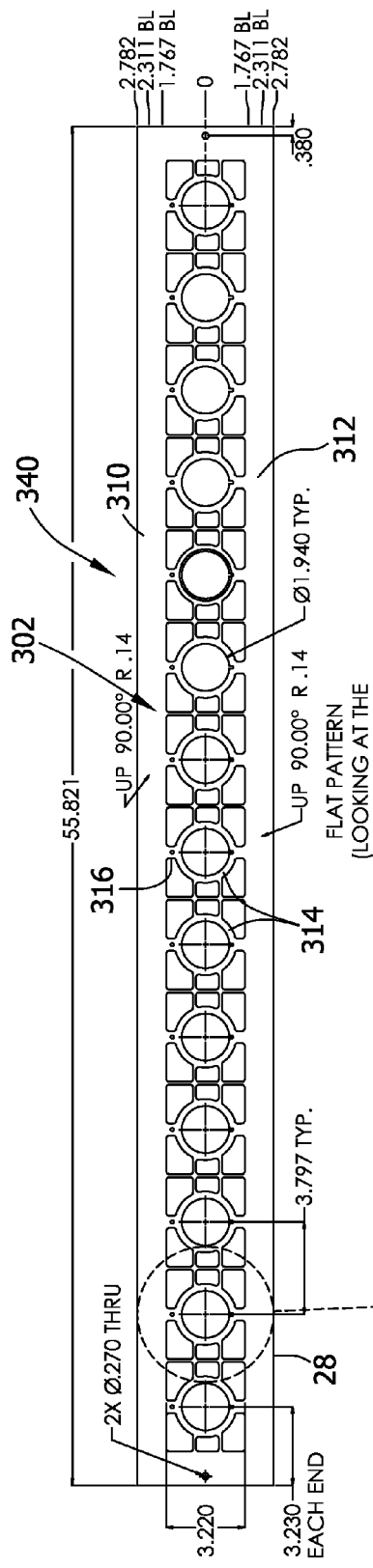
FIG. 26 is a top view of a third exemplary embodiment of a mold rack channel for the forming stage.
Figure 27:
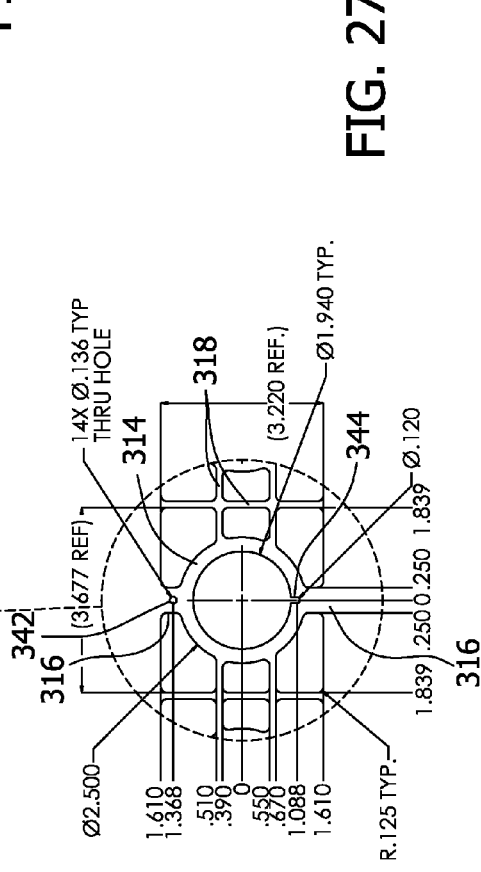
FIG. 27 is a detailed view of a portion of the mold rack channel shown in FIG. 26.
Figure 28:
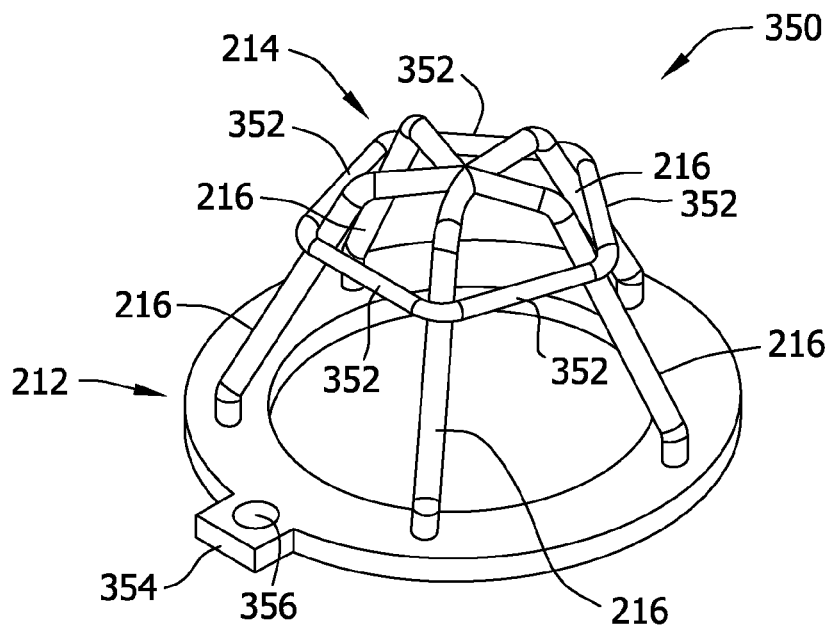
FIG. 28 is a perspective view of a second exemplary embodiment of a mold assembly for use with a mold rack.
Figure 29:
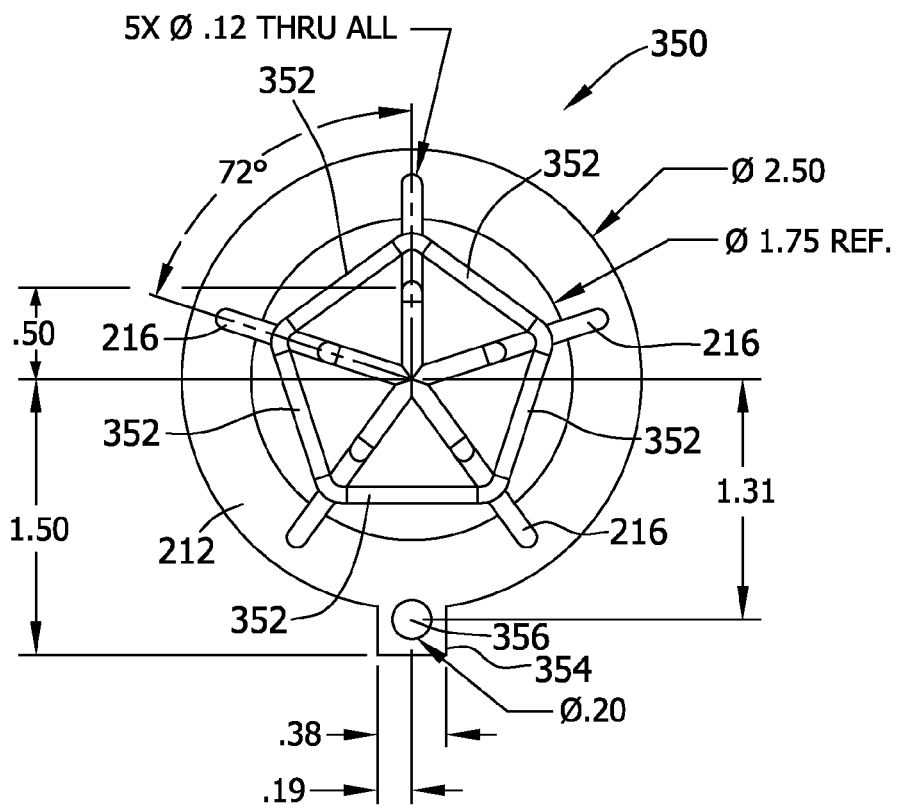
FIG. 29 is a top view of the mold assembly shown in FIG. 28.
Figure 30:
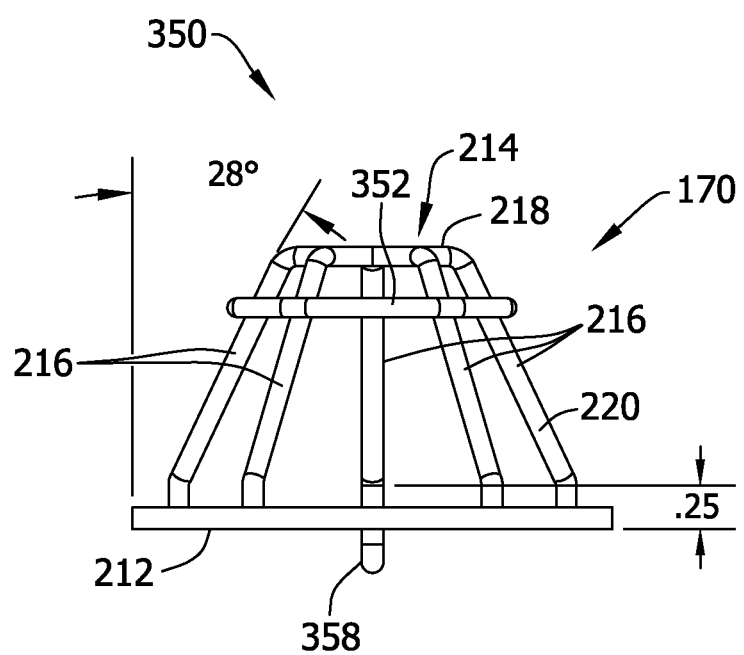
FIG. 30 is a first side elevational view of the mold assembly shown in FIG. 28.

FIGS. 26 and 27 illustrate in respective top view and detail view a third exemplary mold rack 340 that may be utilized in lieu of the mold rack 330 on the forming belt 200. Common features of the mold racks 340 and 330 are indicated with like reference characters.

As best shown in FIG. 27, the mold rack 340 includes a mounting aperture 342 and a mounting slot 344 that oppose one another. The aperture 342 and slot 344 cooperate to retain a mold assembly as described below.

FIGS. 28-31 show various views of another mold assembly 350 that may be utilized with the mold rack 340 (FIGS. 26 and 27). Like elements of the mold rack 350 and the mold rack 330 (FIGS. 23-25) are indicated with like reference characters in the Figures.

The mold rack 350 includes, in addition to the arms 216, peripheral support arms 352 extending generally coplanar to one another in spaced relation from but generally planar to the base 212. In the example shown in FIG. 29, the support arms 352 extend between the arms 216 and define a pentagon-shaped periphery about a portion of the arms 216. The arms 352 may be provided as an assembly that is coupled to one or more of the arms 216 in a known manner, including but not limited to tack welding. While five arms 352 are shown in relation to five arms 216, other numbers of arms 352 and arms 216 are possible. Further, the number of arms 352 and the numbers of arms 216 need not necessarily be the same in all embodiments, and by utilizing varying numbers of arms 352 and 216, varying shapes of the preforms in the forming stage are possible.

The peripheral arms 352 provide further support to the mold assembly 350 and also additional points of contact with the preforms 180 during the shaping processes in the forming station 126. Increased surface contact with the preforms 182, by virtue of the arms 352 may further reduce or avoid any tendency of the most preforms to tear in the forming stage. The peripheral arms 352 are also beneficial by preventing overforming of the chips in the fryer in which the upper edge 160 of the chip side wall 104 gathers and constricts the opening to the receptacle 108 as shown in FIG. 1. It is recognized, however, that in certain embodiments the arms 352 may be considered optional.

Figure 31:
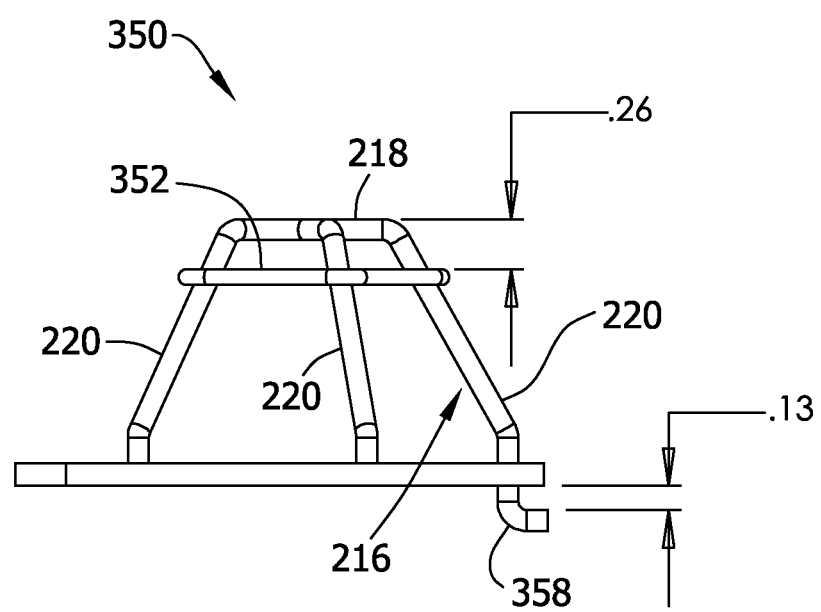
FIG. 31 is a second side elevational view of the mold assembly shown in FIG. 28.
Figure 32:
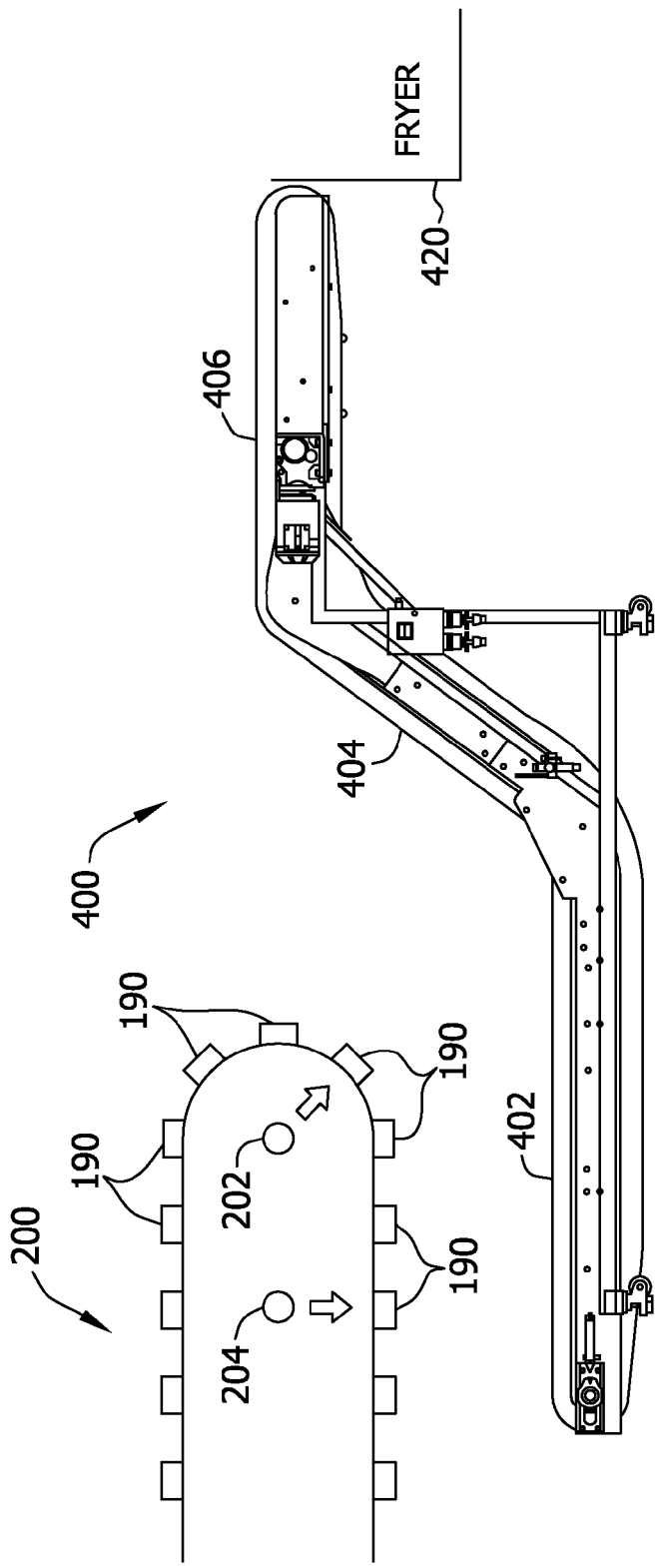
FIG. 32 is a side elevational view of an exemplary oven discharger conveyor for the equipment line shown in FIG. 2

The base 212 includes a protruding tab 354 including a mounting aperture 356. As shown in FIGS. 31 and 32, one of the arms 216 extends through and beneath the base 212 and defines a hook 358. The hook 358 may be loosely received in the slot 344 (FIG. 27) of the mold rack 340, and a fastener such as a rivet may secure the base 212 to the mold rack collar 314 via the aperture 342 (FIG. 18) and the aperture 356 in the mounting tab 314. As such, the mold assembly 350 is attached to the mold rack 340 using only fastener. If that fastener should become loose and separate from the mold assembly 350 in use, the loose engagement of the hook 358 in the slot 344 will allow the mold assembly 350 to separate completely from the mold rack 340. Separation of the mold assembly 350 may therefore serve as a clear indicator of a potential contamination issue of the food product if the fastener was to have fallen into the food product in the production line. By comparison, the mold assembly 210 (FIGS. 20 and 21) which attaches to a mold rack via multiple fasteners presents contamination issues via lost fasteners that would be comparatively very difficult to detect.

FIG. 32 is a side elevational view of an exemplary oven discharger conveyor 400 for the equipment line shown in FIG. 2. The discharge conveyor 400 collects the formed and dried chips discharged from the oven belt 200 exiting the oven 260, and carries the dried chips to a fryer 420.

A shown in FIG. 32, the dried chips may be removed from the inverted, cup-shaped molds on the mold racks 190 after being passed through oven 260 and drying is complete. Specifically, as the mold racks 190 reach the end of the forming belt 200, the mold rack 190 is flipped 180° by the action of the belt 200 to return the mold rack 190 back to the forming stage 122 for deposit of sheeted moist preforms. The formed and baked chips 100 on the mold assemblies described above that are carried on the racks 190 will fall off the mold assemblies via gravitational forces as the mold rack is flipped. Another blower and forced air manifold, similar to those described above, or alternatively a source of compressed air, may optionally be provided at the end of the forming belt 200 where this occurs to provide an air blast to assist with removal of any chips 100 that may stick to the mold assemblies 210.

In an exemplary embodiment, the forming belt 200 overhangs the discharger conveyor 400, and the forming belt 200 is provided with a first air assist discharge element 202 and a second air assist discharge element 204. The first air assist discharge element 202 is located proximate the end of the forming belt 200 where the mold racks 190 turn the radius and flip their orientation as shown. That is, while at the top of the forming belt 200 shown in FIG. 32 the mold racks 190 face upward, at the bottom of the forming belt 200 after traversing the radius the mold racks 190 face downward. The first air assist discharge element 202 generates airflow in an angular direction as the mold racks 190 traverse the radius of the belt and tip downwardly. The airflow generated, as shown by the arrow adjacent the air assist discharge element 202, provides additional force that combines with gravitational force to remove the formed chips 100 from the mold assemblies carried by the mold racks 190 as they pass by the first air assist discharge element 202.

The second air assist discharge element 204 is provided downstream from the first air flow element and generates airflow in a direction perpendicular to the plane of the mold racks 190 after they traverse the radius at the end of the forming belt 200. The airflow generated by the second air assist discharge element 204, as indicated by the arrow proximate the second air assist discharge element 204, provides a vertically oriented downdraft to remove any chips 100 that may stubbornly stick to the mold assemblies even after passing by the first air assist discharge element 206. By virtue of the overhanging arrangement of the forming belt 200, whether the chips are removed via gravitational forces alone, or combined gravitational forces and action of the discharge elements 202, 204 the chips are collected on the discharger conveyor.

The first and second air assist discharge elements 202, 204 may be air lines passing through the forming belt 200 in a direction perpendicular to the plane of the page of FIG. 32, and the air lines may include ports or nozzles to direct airflow across the mold assemblies as they pass under the discharge elements 202, 204. The airflow generated is distributed across the axial length of the mold racks 190 to remove all the chips from all the mold assemblies.

Effective removal of the chips 100 from the mold racks 190 is therefore provided while still using a greatly simplified mold racks compared to conventional systems and methods for making snack chips.

Upon removal from the mold assemblies, the rigidified chips having the cup-shape fall a short distance from the mold racks 190 onto the oven discharge belt 400. The discharge belt 400 includes a flat section 402, an inclined section 404, and second flat section 406 leading to the fryer 420. The dried chips from the forming belt 200 are according transported a first distance on the flat section 402, are raised on the inclined section 404 to an elevated height, and then carried on the second flat section 406 where the chips are fed to the fryer 420 and fried in oil in the frying stage. In a contemplated embodiment, the dried chips spend an equilibration time of about one minute on the conveyor belt 400 before being introduced to the fryer 420.

In an exemplary embodiment, the fryer 420 includes a submerger belt and baffles carrying the chips through oil in the fryer for a designated amount of time. In one example, the fryer 420 is operated at a set point of about 365° F., and the chips experience a submerger belt time of about 21.5 seconds in the oil. This facilitates a finished oil content of about 22% in the chips. Other variations are, of course, possible.

The chips exit the fryer 420 in a manner to ensure that collected oil in the cup-shaped receptacles in the chips is removed. After any oil collected in the chips is removed and the chips are dry, the chips are sent to a seasoning stage, if applicable, and then to a final packaging stage.

The benefits and advantages of the inventive concepts disclosed are now believed to amply demonstrated in the exemplary embodiments described.

A system for manufacturing edible, shaped food articles from an initial batch ingredient material has been disclosed. The system includes: a sheeting stage configured to output discrete flat pieces of the batch ingredient in a moist and generally pliable state; and a forming stage including a plurality of mold assemblies, wherein the discrete flat pieces of the batch ingredient are draped over an exterior surface of the respective mold assemblies, and the discrete pieces of the batch ingredient are shaped with gravity assistance over the exterior surface of the respective mold assemblies.

Optionally, the mold assembles are configured to shape the discrete flat pieces of the batch ingredient, with gravity assistance, into a three dimensional cup-shaped food product. The mold assemblies may be removably attached to a plurality of mold racks. The mold racks may be provided in a U-shaped channel configuration. The U-shaped channel configuration may include a generally planar top section, first and second legs depending at opposite edges of the top section in a substantially perpendicular manner to the top section, and first and second side panels depending from the respective first and second legs, the first and second side panels extending parallel to the top section. The mold racks may be carried on a forming belt in the forming stage. The forming stage may include an oven, the forming belt passing through the oven.

Each of the plurality of mold assemblies may include a base and a shaped body attached to the base. The base in each of the mold assemblies may include an annular ring. The base in each of the mold assemblies may be configured with a universal mounting arrangement for removable attachment to a mold rack. The shaped body may include a wire basket. The wire basket may include multiple arms joined to the base at one end and to each other at their opposing ends. The arms may be arranged in a star-shape, whereby when the discrete pieces of the batch ingredient are draped over the exterior surface of the molds, the discrete pieces of the batch ingredient are shaped, with gravity assistance, into a cup shape having a flared side wall including a wavy side surface profile with both convex and concave surfaces.

The wire basket may include multiple arms each including a generally coplanar top section extending substantially parallel to but spaced from the base, angled sections extending downwardly and outwardly away from the top sections toward the mold base, and mounting sections extending substantially perpendicular to the mold base.

The shaped body in each mold assembly may project upwardly from the base and may define a generally inverted cup-shaped mold form, with the discrete flat pieces of the batch ingredient being draped over the shaped body in the forming station. The shaped body may include five wire members. The shaped body may also peripheral support members arranged pentagonally on the shaped body.

The initial batch ingredient material may be masa dough, and the masa dough may include corn particles ranging in size from about 0.029 inches to about 0.033 inches.

The forming station may be configured to direct forced air over the mold assemblies after the discrete flat pieces of the batch ingredient are draped over the exterior surface of the respective mold assemblies. The forming station may include a blower and a directional airflow orifice plate. The orifice plate may be configured to simultaneously direct air in different directions around the mold assemblies.

The system may further include at least one transfer belt receiving the discrete flat pieces of the batch ingredient and depositing the discrete flat pieces of the batch ingredient material onto the forming stage. The at least one transfer belt comprises a first transfer belt operated at a first speed that is higher than a speed of the sheeting stage, and a second transfer belt operated at a second speed that is different than the first speed. The at least one transfer belt may be longitudinally movable relative to the forming stage, wherein the forming stage can be operationally bypassed or restored by opening and closing a gap between the at least one transfer belt and the forming stage. The at least one transfer belt may be adjustable in position relative to the forming stage in a direction perpendicular to the path of travel of the at least one transfer belt. The forming station may include a forming belt, and the forming belt may be movable relative to the at least one transfer belt.

The system may include an oven configured to toast and bake the shaped discrete pieces of the batch ingredient, thereby drying the shaped discrete pieces of the batch ingredient into rigid, crisp, cup-shaped food product. The draped flat pieces of the batch ingredient may be transported though the baking stage without removing them from the mold assemblies. The system may also include a fryer stage. A directional airflow component may be operable to assist with removing of the rigid, crisp, cup-shaped food product from the mold assemblies.

An exemplary method for manufacturing edible, shaped food articles from an initial batch ingredient material has also been disclosed, The method includes: sheeting the batch material into discrete flat pieces in a moist and generally pliable state; and forming, with gravity assistance, the discrete flat pieces into a three dimensional shape by draping the discrete flat pieces of the batch ingredient over an exterior surface of a plurality of respective mold assemblies.

Each mold assembly may include an inverted cup-shaped body, and forming the discrete flat pieces comprises draping the discrete flat pieces over the respective inverted cup-shaped bodies. The method may also include removably mounting the mold assemblies to a respective one of a plurality of mold racks. The method may include mounting the mold racks to a forming belt and passing the forming belt through an oven. The method may include passing the forming belt through a multi-zone oven, wherein each of the multi-zone includes different heating elements. The method may include mixing a masa dough including corn particles ranging in size from about 0.029 inches to about 0.033 inches, and providing the masa dough as the initial batch ingredient. The method may include directing forced air over the mold assemblies after the discrete flat pieces of the batch ingredient are draped over the exterior surface of the respective mold assemblies.

The method may include comprising synchronizing a speed of the sheeted discrete flat pieces with a speed of the mold assemblies. Synchronizing a speed of the output discrete flat pieces with a speed of the mold assemblies may include operating at least one transfer belt. The method may also include longitudinally moving the transfer belt relative to the mold assemblies, thereby operationally bypassing or restoring a transfer of the output discrete flat pieces by opening and closing a gap between the at least one transfer belt and the mold assemblies. The method may include adjusting a position of the at least one transfer belt relative to the mold assemblies in a direction perpendicular to the path of travel of the at least one transfer belt. The method may also include baking the draped pieces, thereby drying the shaped discrete pieces of the batch ingredient into rigid, crisp, cup-shaped food product. The method may include frying the baked pieces, and directing forced air to the baked pieces to remove them from the mold assemblies.

A process for manufacturing edible, cup-shaped food articles from an initial batch ingredient material has been disclosed. The process includes: sheeting the batch material into discrete flat pieces in a moist and generally pliable state; forming, with gravity assistance, the discrete flat pieces into a three dimensional cup shape by draping the discrete flat pieces of the batch ingredient over an exterior surface of a plurality of respective inverted cup-shaped mold bodies; directing forced air on the surfaces of the draped pieces to uniformly shape them on the cup-shaped mold bodies; and baking the uniformly shaped pieces to rigidify the pieces into rigid, freestanding cup-shaped food articles.

Snack chips may be formed by the process, wherein the chip comprises a base and a curvilinear side wall having convex and concave sections. The side wall may include a top edge, with the top edge being generally star-shaped.

A process for manufacturing a cup-shaped snack chip from a masa dough material has also been disclosed. The process includes: sheeting the masa dough material into circular flat pieces in a moist and generally pliable state; and forming the circular pieces in an upside down orientation, with gravity assistance and directed airflow, into a three dimensional cup-shaped chip.

The three dimensional cup-shaped chip may include a base and a curvilinear side wall having convex and concave sections, the side wall having a top edge, and the top edge being generally star-shaped.

A cup-shaped snack chip has also been disclosed including a base fabricated from an edible material; and a continuously extending and curvilinear side wall extending upwardly from the base, the side wall also fabricated from the edible material; wherein the side wall has an upper edge that is substantially star-shaped, and the side wall has outwardly flared side surfaces extending from the base to the upper edge; and wherein the base and side wall collectively define a receptacle for a consumer's use to enhance a flavor of the edible material.

Optionally, the edible material may be a masa dough including corn particles ranging in size from about 0.029 inches to about 0.033 inches.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for manufacturing edible, shaped food articles from an initial batch ingredient material, the method comprising:
    sheeting the batch material into discrete flat pieces in an unbaked and unfried state;
    draping the discrete flat pieces of the batch ingredient over an exterior surface of a plurality of respective mold assemblies and forming the discrete flat pieces of batch material into a three dimensional shape with gravity assistance and with directed forced air applied after the discrete flat pieces of the batch ingredient are draped over the exterior surface of a plurality of respective mold assemblies.

2. The method of claim 1, wherein each mold assembly comprises an inverted cup-shaped body, and forming the discrete flat pieces comprises draping the discrete flat pieces over the respective inverted cup-shaped bodies.

3. The method of claim 1, further comprising removably mounting the mold assemblies to a respective one of a plurality of mold racks.

4. The method of claim 3, further comprising mounting the mold racks to a forming belt.

5. The method of claim 4, further comprising passing the forming belt through an oven.

6. The method of claim 5, further comprising passing the forming belt through a multi-zone oven, wherein each of the multi-zone includes different heating elements.

7. The method of claim 1, further comprising mixing a masa dough including corn particles ranging in size from about 0.029 inches to about 0.033 inches, and providing the masa dough as the initial batch ingredient.

8. The method of claim 1, further comprising synchronizing a speed of the sheeted discrete flat pieces with a speed of the mold assemblies.

9. The method of claim 8, wherein synchronizing a speed of the output discrete flat pieces with a speed of the mold assemblies comprises operating at least one transfer belt.

10. The method of claim 9, further comprising longitudinally moving the transfer belt relative to the mold assemblies, thereby operationally bypassing or restoring a transfer of the output discrete flat pieces by opening and closing a gap between the at least one transfer belt and the mold assemblies.

11. The method of claim 9, further comprising adjusting a position of the at least one transfer belt relative to the mold assemblies in a direction perpendicular to the path of travel of the at least one transfer belt.

12. The method of claim 1, further comprising baking the draped pieces, thereby drying the shaped discrete pieces of the batch ingredient into rigid, crisp, cup-shaped food product.

13. The method of claim 12, further comprising frying the baked pieces.

14. The method of claim 12, further comprising directing forced air to the baked pieces to remove them from the mold assemblies.

15. The method of claim 1, wherein the moisture content of the batch material sheeted into discrete flat pieces is about 46%.

16. The method of claim 1, additionally comprising a step of increasing the moisture content of the discrete flat pieces in an unbaked and unfried state prior to draping the discrete pieces of batch material over the exterior surface of the mold assemblies.

17. A process for manufacturing edible, cup-shaped food articles from an initial batch ingredient material, the process comprising:
- sheeting the batch material into discrete flat pieces in an unbaked and unfried state;
- forming, with gravity assistance, the discrete flat pieces into a three dimensional cup shape by draping the discrete flat pieces of the batch ingredient over an exterior surface of a plurality of respective inverted cup-shaped mold bodies
- directing forced air on the surfaces of the draped pieces to uniformly shape them on the cup-shaped mold bodies; and
- baking the uniformly shaped pieces to rigidify the pieces into rigid, freestanding cup-shaped food articles.

18. The method of claim 17, wherein the moisture content of the batch material sheeted into discrete flat pieces is about 46%.

19. The process of claim 17, additionally comprising a step of increasing the moisture content of the discrete flat pieces in an unbaked and unfried state prior to forming the discrete pieces of batch material into a three dimensional cup shape.

20. The process of claim 17, wherein the directing of forced air on the surfaces of the draped pieces to uniformly shape them on the cup-shaped mold bodies also at least partially dries the draped pieces.

* * * * *